(12) United States Patent
Small

(10) Patent No.: US 7,936,305 B2
(45) Date of Patent: May 3, 2011

(54) SYSTEM AND METHOD FOR DETERMINING ATTITUDE USING SPATIAL SHIFT KEY (SSK) MODULATION SIGNATURES

(75) Inventor: David Small, Canberra (AU)

(73) Assignee: Locata Corporation Pty Ltd, Griffith, ACT (AU)

( * ) Notice: Subject to any disclaimer, the term of this patent is extended or adjusted under 35 U.S.C. 154(b) by 490 days.

(21) Appl. No.: 10/565,875

(22) PCT Filed: Aug. 3, 2004

(86) PCT No.: PCT/AU2004/001024
§ 371 (c)(1),
(2), (4) Date: Jan. 24, 2006

(87) PCT Pub. No.: WO2005/012934
PCT Pub. Date: Feb. 10, 2005

(65) Prior Publication Data
US 2007/0100548 A1    May 3, 2007

(30) Foreign Application Priority Data
Aug. 4, 2003   (AU) ................................ 2003904046

(51) Int. Cl.
*G01S 1/44*   (2006.01)

(52) U.S. Cl. ...................................................... 342/398
(58) Field of Classification Search .......... 342/385–399; 701/214
See application file for complete search history.

(56) References Cited

U.S. PATENT DOCUMENTS

| | | | | |
|---|---|---|---|---|
| 5,574,467 | A | * 11/1996 | Saunders ........................ | 342/398 |
| 6,128,557 | A | * 10/2000 | Fenton et al. .................... | 701/13 |
| 6,437,742 | B1 | * 8/2002 | Niesen et al. ................... | 342/418 |

* cited by examiner

*Primary Examiner* — Thomas H Tarcza
*Assistant Examiner* — Nga X Nguyen

(57) ABSTRACT

An attitude system that includes a radiating means which moves predeterminately through three-dimensional space, such that a cyclic Doppler is superimposed upon a transmitted signal; receiving this transmitted signal through a receiving means which moves predeterminately through three-dimensional space, such that a cyclic Doppler is superimposed upon the received signal; analyzing the movement of the receive means in relation to the radiating means by interpreting the received cyclic Doppler; and determining attitude based on the interpreted Doppler. Or alternatively, adjusting the movement of the receive means in three-dimensional space so the superimposed cyclic Doppler is minimized on the received signal and; determining attitude based on the adjustment required to bring the receive means and radiating means into an alignment.

18 Claims, 10 Drawing Sheets

SYSTEM AND METHOD FOR DETERMINING ATTITUDE USING SPATIAL SHIFT KEY (SSK) MODULATION SIGNATURES

FIELD OF THE INVENTION

The present invention relates generally to systems and methods for generating precise attitude determination for a mobile apparatus. In particular, the present invention applies to spatial modulation systems which allow absolute attitude determination utilizing the correlation of spatially modulated signals.

BACKGROUND TO THE INVENTION

Attitude can be defined as the inclination of a user platform relative to a reference frame in three-dimensional space. The technologies traditionally used for attitude determination can be categorized into two groups. The first group provides absolute attitude measurements with respect to a reference. Examples of this kind of technology are magnetic field sensors, optical trackers, and star sensors. The second group can only provide measurements of changes in attitude. Examples are gyroscopes (mechanical, MEMS, ring laser and fiber optic) and angular accelerometers. Collectively, devices in this second group are known as inertial devices. Applications using inertial devices require the initial attitude to be known. This is normally achieved using technologies from the first group. Only when an initial attitude is available to the application can subsequent absolute attitude be determined from measurements provided by the second group.

Unfortunately, many problems exist in using devices from either group. The calculated attitude derived from inertial devices suffers from continuous drift over time due to accumulated measurement errors in angular rates, and therefore an inertial system must be frequently realigned to a reference if it is to be useful. An optical tracker's operation is limited by the field of view of its sensors, which must be unobstructed for normal operation. Star sensors, which involve star pattern recognition, have the added limitation of only being operational on cloudless nights for earth based systems. Determining orientation using magnetic field sensors relies on the integrity of the reference magnetic field. This field is often distorted, for example by large ferrous objects in proximity to the magnetic field sensor, rendering performance unsatisfactory in environments like large industrial areas, factories and warehouses.

An alternative to the traditional methods of attitude determination described above is an extension of the carrier-phase positioning techniques used by Global Positioning System (GPS) receivers. Carrier-phase positioning determines position by determining the Doppler induced upon received positioning signals when a user receiver is in motion. The user receiver accumulates these Doppler measurements over time, thereby producing highly accurate change-of-range measurements known in the art as accumulated Doppler, or Integrated Carrier Phase (ICP) measurements. Integrated Carrier Phase (ICP) measurements are processed by the user receiver to derive accurate change-of-range measurements from a plurality of satellites at known locations, which in turn can be used to determine accurate position relative to a known initial location. This initial location is generally derived from code-based pseudorange measurements which are modulated upon the carrier signals transmitted from each satellite. Due to the lack of precision inherent in the code-based pseudoranges, a cycle ambiguity remains when determining this initial starting location. This cycle ambiguity must be resolved, using techniques well-known in the art, before high-accuracy positioning can take place. Although carrier-phase positioning systems work well for precise position determination, they possess no inherent means for determining attitude.

Prior art systems have attempted to overcome this limitation. In particular, U.S. Pat. No. 5,548,293 in the name of Cohen discloses a carrier-phase based positioning system wherein attitude is determined by spatially distributing a plurality of GPS receivers on a mobile platform and concurrently collecting carrier-phase range measurements from all GPS satellites in view. Carrier-phase range differences are subsequently calculated between GPS receivers to determine the attitude of the user platform. Cohen's method is not only complicated and costly due to the number of carrier-phase GPS receivers required, but it also requires integer cycle ambiguities to be resolved before attitude can be determined. Furthermore, the use of GPS signals requires the plurality of GPS receivers to be in clear view of the satellites at all times, thus eliminating the ability of the system to operate in satellite-occluded environments, such as indoors. Moreover, the reflection of positioning signals, known as multipath, degrades range measurement accuracy from each satellite, which therefore degrades attitude determination when using Cohen's method.

There is clearly a need for a robust absolute attitude determination system that does not require (a) reference magnetic field integrity, (b) an unobstructed view of the stars, (c) line-of-sight for optical measurements, (d) continual re-initialization, (e) an unobstructed view of a Global Navigation Satellite System (GNSS), (f) multiple position receivers distributed over a user platform, or (g) the requirement for carrier cycle integer ambiguity resolution. A system that operates without these constraints is highly desirable. The present invention achieves this desirable goal by transmitting signals that are modulated with a three-dimensional spatial signature, modulating a receiving means with a complementary three-dimensional spatial signature, and interpreting the received signals to determine attitude. This system and method is hereinafter termed Spatial Shift Key (SSK) modulation, and is described in detail below.

OBJECTS OF THE INVENTION

It is an object of the present invention to provide an attitude determination system by transmitting signals that are modulated with a three-dimensional Doppler signature, modulating a receiving means with a complementary three-dimensional Doppler signature, and interpreting the received signals to determine attitude.

It is yet a further object of the present invention to provide an attitude determination system utilizing the spatial correlation of a transmitted signal modulated with a three-dimensional Doppler signature to a receiving means modulated with a complementary three-dimensional Doppler signature.

It is yet a further object of the present invention to provide an attitude determination system utilizing the spatial correlation of a transmitted spatially modulated Doppler signature to a receiving means modulated with a replica spatially modulated Doppler signature.

It is yet a further object of the present invention to provide an attitude determination system for a user receiver configured with a receive antenna that is modulated with a three-dimensional Doppler signature, the user receiver further utilizing a combination of early and late tracking arms, or early, prompt and late tracking arms, to maintain spatial coherence with a transmitted signal which has been modulated with a three-dimensional Doppler signature.

It is yet a further object of the present invention to provide an attitude determination system utilizing a Doppler pattern recognition algorithm to detect the attitude of a receive antenna modulated with a three-dimensional Doppler signature relative to a transmitted signal modulated with a three-dimensional Doppler signature.

It is yet a further object of the present invention to provide an attitude determination system which can identify and subsequently mitigate the adverse effects of signals that have been corrupted by multipath.

It is yet a further object of the present invention to provide an antenna array that creates a three-dimensional phase centre movement in either transmitted or received signals.

It is yet a further object of the present invention to provide an electronic means for spatial modulation, providing for precise generation of a signal modulated with a three-dimensional Doppler signature, yet requiring a minimum of physical antenna elements.

It is yet a further object of the present invention to provide an attitude determination system which does not require a user receiver to use carrier tracking loops in determining attitude.

It is yet a further object of the present invention to provide an attitude determination system which removes user movement and user receiver clock drift from Doppler measurements.

It is yet a further object of the present invention to provide an attitude determination system free of the need to perform carrier cycle integer ambiguity resolution.

It is yet a further object of the present invention to provide an attitude determination system which requires only a single user receiver to determine attitude.

SUMMARY OF THE INVENTION

The foregoing objects of the present invention are achieved by the transmission of a signal through a radiating means which moves predeterminately through three-dimensional space, such that a cyclic Doppler is superimposed upon the transmitted signal; receiving this transmitted signal through a receiving means which moves predeterminately through three-dimensional space, such that a cyclic Doppler is superimposed upon the received signal; adjusting the movement of the receive means in three-dimensional space so the superimposed cyclic Doppler is minimized on the received signal and; determining attitude based on the adjustment required to bring the receive means and radiating means into an alignment.

Alternatively, the foregoing objects of the present invention are achieved by the transmission of a signal through a radiating means which moves predeterminately through three-dimensional space, such that a cyclic Doppler is superimposed upon the transmitted signal; receiving this transmitted signal through a receiving means which moves predeterminately through three-dimensional space, such that a cyclic Doppler is superimposed upon the received signal; analyzing the movement of the receive means in relation to the radiating means by interpreting the received cyclic Doppler; and determining attitude based on the interpreted Doppler.

The present invention discloses a system and method to determine attitude by correlating a so-called Spatial Shift Key Transmit (SSK-T) modulation signature with a so-called Spatial Shift Key Receive (SSK-R) modulation signature. A Spatial Shift Key Transmit (SSK-T) modulation signature is generated by the movement of a radiating means in three-dimensional space, such that a predetermined Doppler signature is superimposed upon the original transmitted signal. A Spatial Shift Key Receive (SSK-R) modulation signature is achieved by the movement of a receive means in three-dimensional space, such that a predetermined Doppler signature is superimposed upon a received signal. The terms "Doppler" and "Doppler signature" in this specification embrace the well-understood concept of the apparent frequency changes in a wave resulting from the relative motions of a transmission source and a receiver. However, the terms "Doppler" and "Doppler signature" as used in this specification additionally incorporate the apparent changes in received phase, frequency, or Integrated Carrier Phase (ICP) created by the relative motion of a transmission means and a receive means. Correlation of a Spatial Shift Key Transmit (SSK-T) modulation signature with a Spatial Shift Key Receive (SSK-R) modulation signature results in the radiating means and receive means being in spatial alignment. This alignment is hereinafter referred to as either "spatial correlation" or "spatial synchronization". The features, characteristics and applications of these novel terms, "Doppler signature", "spatial correlation" and "spatial synchronization", are described in detail below.

By using the present invention, with the radiating means attitude known a priori a receive means attitude can be accurately determined.

OVERVIEW

Figure 1:
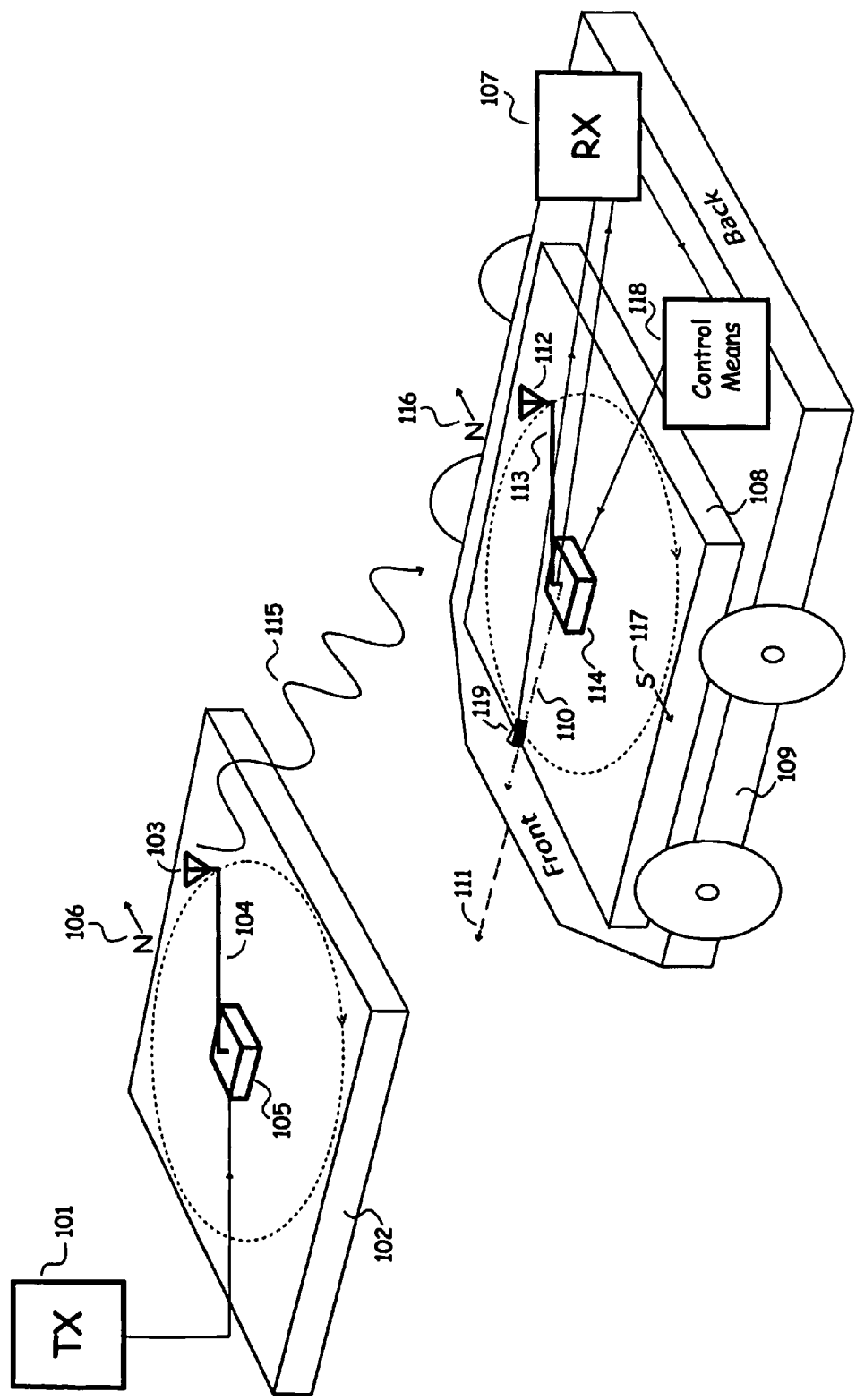
FIG. 1 is a graphical representation of a simple mechanical embodiment of a Spatial Shift Key (SSK) modulation system according to the present invention, incorporating a Spatial Shift Key Transmit (SSK-T) antenna transmitting a spatially modulated signal to a Spatial Shift Key Receive (SSK-R) antenna.

A system and method to determine receiver attitude by spatially correlating a Spatial Shift Key Transmission (SSK-T) signature with a locally generated Spatial Shift Key Receive (SSK-R) signature is disclosed. A transmitter is configured to generate a positioning signal through a Spatial Shift Key Transmit (SSK-T) antenna which moves its phase center through space with predefined motion. This predefined motion repeats at a predetermined interval, thereby inducing a predetermined cyclic Doppler pattern on the transmitted positioning signal. This predetermined interval is termed the "signature period", with the predetermined cyclic Doppler pattern being termed a "Doppler signature". A user receiver is configured to receive the Doppler-modified positioning signal through a Spatial Shift Key Receive (SSK-R) antenna, which also moves its phase center through space with the same predefined motion, repeating the movement at the same predetermined interval as the Spatial Shift Key Transmit (SSK-T) antenna The Spatial Shift Key Receive (SSK-R) antenna therefore induces a second cyclic Doppler component on the already Doppler-modified transmitted positioning signal. An antenna synchronization control means within the user receiver continuously adjusts the frequency and phase of the Spatial Shift Key Receive (SSK-R) antenna predefined motion to match the transmitted Doppler signature by driving the measured Doppler of the received positioning signal toward zero. Once the received Doppler is minimized the Spatial Shift Key Transmit (SSK-T) antenna and the Spatial Shift Key Receive (SSK-R) antenna are moving in unison, they are declared spatially correlated by the user receiver. The attitude of the Spatial Shift Key Receive (SSK-R) antenna can now be determined accurately relative to the attitude of the Spatial Shift Key Transmit (SSK-T) antenna by measuring the antenna synchronization control means offset required to bring the antennas into spatial correlation.

When a Spatial Shift Key Transmit (SSK-T) antenna moves its phase center through space with a predefined motion, and a Spatial Shift Key Receive (SSK-R) antenna ascribes an identical predefined motion in the same predetermined interval, this identical movement of the periodicities is termed spatial synchronization or, alternatively, spatial correlation. It is important to understand that in the context of this specification the term synchronization does not solely refer to the concept of a coincidence in time. Spatial synchronization as used in this specification encompasses identical periods of antenna movement in both time and space.

Spatial Shift Key (SSK) modulation signatures can be generated using many different media For example, sound waves in the audible human spectrum, ultrasonics, infrared, and radio waves can all be used. In the preferred embodiment of the present invention, radio frequency (RF) waves are the preferred medium. Therefore, in the preferred embodiment of the present invention Spatial Shift Key Transmission (SSK-T) modulation is achieved by the movement of a transmit antenna phase center in three-dimensional space, such that a predetermined phase, frequency, Integrated Carrier Phase, or Doppler signature is superimposed upon the original transmitted radio frequency (RF) signal. Spatial Shift Key Receive (SSK-R) modulation is achieved by movement of a receive antenna phase center in three-dimensional space, such that a predetermined phase, frequency, Integrated Carrier Phase, or Doppler signature is superimposed upon the received radio frequency (RF) signal.

System and Method

Referring now to FIG. 1, there is depicted a simple planar mechanical embodiment of the present invention. A positioning signal transmitter 101 is configured with a Spatial Shift Key Transmit (SSK-T) antenna 102. The Spatial Shift Key Transmit (SSK-T) antenna 102 comprises a transmit antenna element 103 mounted at one end of a rotating arm 104, with the other end of the rotating arm 104 connected to a rotating means 105, such as a servo motor. The rotating arm 104 has a fixed length, and revolves at a predetermined rate for a predetermined period, termed the signature period. The signature period is the duration the transmit antenna element 103 takes to complete one revolution of its predetermined spatial pattern. In this illustrative embodiment, and for ease of explanation, the transmit antenna element 103 rotates at a 1 Hz rate (one complete revolution per second) in a clockwise direction, although this rate may be varied to any rate which falls within the user receiver carrier tracking loop bandwidth. The transmitter rotating arm 104 is also configured so that the transmit antenna element 103 traverses its most northerly point 106 at the beginning of each second. The Spatial Shift Key Transmit (SSK-T) antenna 102 in this illustrative example is therefore configured to use the cardinal direction of North as the principal axis of its reference frame.

A user receiver 107 is configured with a Spatial Shift Key Receive (SSK-R) antenna 108, which is mounted on a user platform 109 and situated on the same plane as the Spatial Shift Key Transmit (SSK-T) antenna 102. The Spatial Shift Key Receive (SSK-R) antenna 108 is attached to the user platform 109 with fixed orientation, such that the principal axis 110 of the Spatial Shift Key Receive (SSK-R) antenna 108 is preferably aligned with the principal axis 111 of the body frame of the user platform 109. Alternatively, if the principal axis 110 of the Spatial Shift Key Receive (SSK-R) antenna 108 and the principal axis 111 of the user platform 109 are not aligned with one another the relative orientation of the two principal axes 110 & 111 may be measured and mathematically aligned with one another. The Spatial Shift Key Receive (SSK-R) antenna 108 comprises a receive antenna element 112 mounted at one end of a receiver rotating arm 113, with the other end of the receiver rotating arm 113 connected to a rotating means 114, such as a servo motor. The receiver rotating arm 113 has identical length to the transmitter rotating arm 104, and is capable of revolving at a variable rate. The user receiver 107 is configured to receive the transmitted positioning signal 115 from the transmit antenna element 103 through the receive antenna element 112, and measure the Doppler value of the received signal. For ease of explanation assume the clocks of the transmitter 101 and user receiver 107 are chronologically synchronous, the Spatial Shift Key Transmit (SSK-T) antenna 102 and the Spatial Shift Key Receive (SSK-R) antenna 108 are stationary, and the transmit antenna element 103 and the receive antenna element 112 are rotating in a clock-wise direction. A varying cyclic Doppler will be observed by the user receiver 107 dependent upon the relative motion of the rotating transmit antenna element 103 with respect to the rotating receive antenna element 112. When the transmit antenna element 103 and the receive antenna element 112 am rotating in unison, both antennas will traverse the most northerly point of their respective rotations concurrently. In this illustrative case, transmit antenna element 103 will traverse its most northerly point 106 at the same time as receive antenna element 112 is traversing its most northerly point 116. The antenna elements 103 & 112 are said to be spatially correlated, and the Doppler measured by the user receiver 107 is at a minimum.

If antenna element rotations diverge from a state of spatial correlation, Doppler will increase until the antenna elements are rotating 180 degrees out of phase relative to each other, and the measured Doppler is at a maximum. When the transmit antenna element 103 and the receive antenna element 112 are rotating 180-degrees out of phase with each other the transmit antenna element 103 traverses the most northerly point of its rotation 106 while the receive antenna element 112 traverses the most southerly point of its rotation 117. The antenna elements are said to be spatially uncorrelated, and the Doppler measured by the user receiver 107 is at a maximum. An antenna synchronization control means 118 is configured to adjust the speed of the rotating means 114, until the received Doppler measured by the user receiver 107 is at a minimum. The antenna synchronization control means 118 increases or decreases the speed of the rotating means 114, so that the receive antenna element 112 slews into alignment with the transmit antenna element 103 rotation. Once the measured Doppler is at a minimum the receive antenna element 112 rotation speed is stabilized to the transmit antenna element 103 rotation speed (in this example 1 Hz) and the transmit antenna element 103 and the receive antenna element 112 are now declared spatially correlated. The antenna synchronization control means 118 continuously applies corrections to the rotating means 114 so that the state of spatial correlation is maintained.

Figure 2:
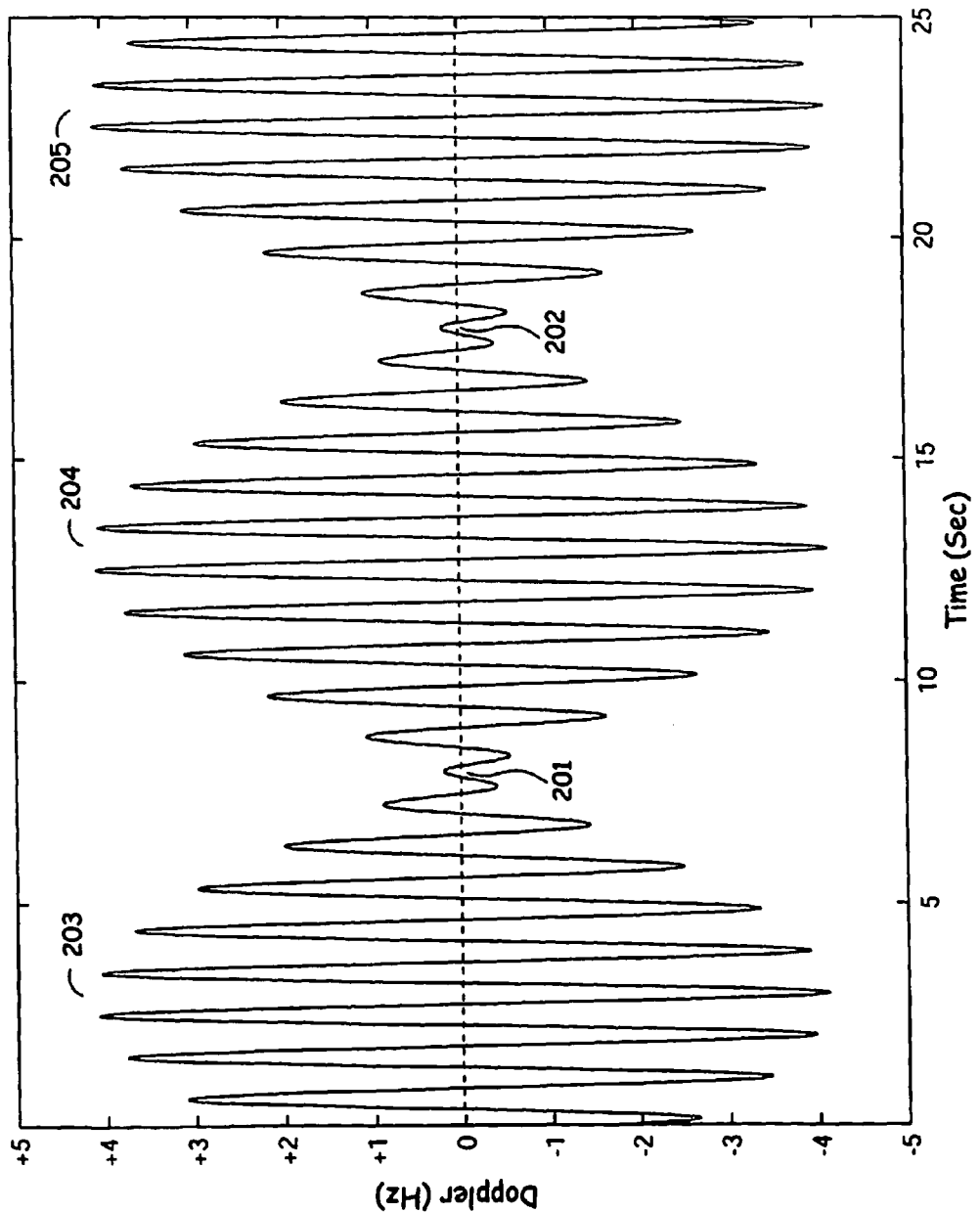
FIG. 2 is a Doppler verses Time graph of the simple mechanical embodiment of the present invention described in FIG. 1, wherein the Spatial Shift Key Receive (SSK-R) antenna element has been rotated at a slightly higher frequency (1.1 Hertz) than the Spatial Shift Key Transmit (SSK-T) antenna element (1 Hertz), such that the receive antenna element has been slewed in and out of alignment with the transmit antenna.

When a transmit antenna element and a receive antenna element are rotating at different constant speeds they will generate a cyclic Doppler. If the receive antenna element 112 is configured to rotate at a slightly higher frequency (1.1 Hertz) than the transmit antenna element 103 (1 Hertz), the receive antenna element 112 is stewed in and out of alignment with the transmit antenna element 103, at the rate of the difference of the two frequencies (0.1 Hertz). Referring now to FIG. 2, there is depicted a Doppler verses Time graph of the Doppler measured from this configuration. Doppler is calibrated in Hertz on the vertical axis and time is calibrated in seconds on the horizontal axis. The minimum Doppler points on the graph 201 & 202 are the points where the two antenna elements are spatially co-incident, whereas the maximum Doppler points on the graph 203, 204, and 205 are points where the two antenna elements are 180-degrees out of phase with one another.

Figure 3:
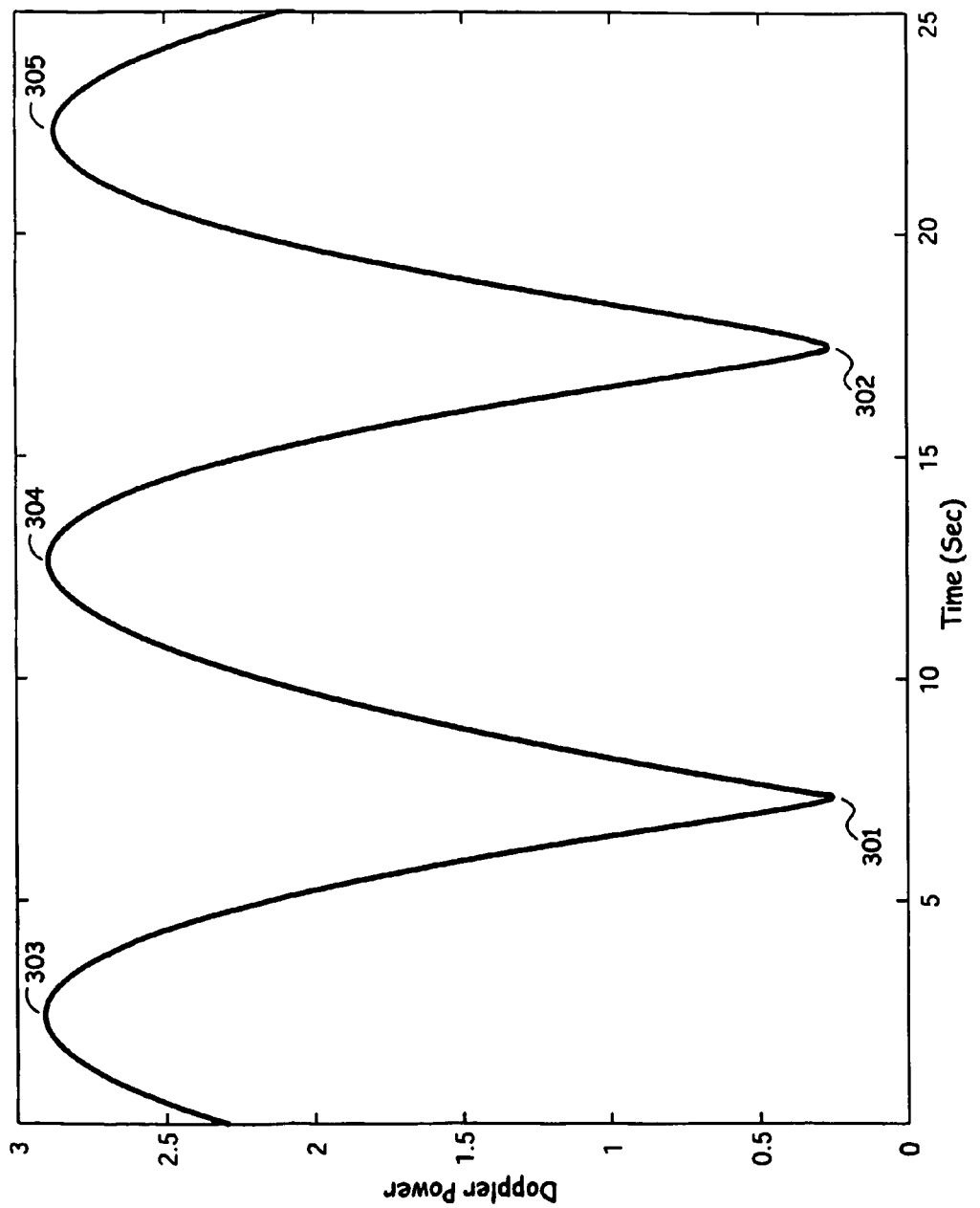
FIG. 3 is a Doppler Power versus Time graph of the process depicted in FIG. 2, whereby measured Doppler is combined over each rotation (signature) period and converted to a Doppler power value.

Referring now to FIG. 3 there is depicted a Doppler Power versus Time graph of the measurements depicted in FIG. 2. The Doppler measurements combined over each 1 second signature period are represented on the vertical axis as a Doppler Power value. The horizontal axis is the same time represented in FIG. 2, also calibrated in seconds. The minimum Doppler power points on the graph 301 & 302 are the points where the two antenna elements are spatially coincident, whereas the maximum Doppler power points on the graph 303, 304, and 305 are points where the two antenna elements are 180-degrees out of phase with one another.

Comparing FIG. 2 and FIG. 3 it can be seen that spatial correlation of a Spatial Shift Key Receive (SSK-R) antenna phase center to a Spatial Shift Key Transmit (SSK-T) antenna phase center is achieved at the points of least Doppler power 301 & 302. Therefore, in one embodiment of the present invention, antenna spatial correlation is achieved by adjusting the antenna synchronization control means to drive the measured Doppler power value over the signature period to a minimum value.

Referring again to FIG. 1, transmit antenna element 103 is configured to traverse its most northerly point of rotation 106 at the beginning of each second. Therefore, when the receive antenna element 112 is spatially correlated with the transmit antenna element 103, the location of the receive antenna element 112 at the beginning of each second represents the most northerly point of its rotation 116. Furthermore, from this information the orientation of the user platform 109 relative to North 116 can be determined accurately. This is achieved by measuring the time (modulo 1 second) when the receive antenna element 112 traverses the principal axis 110 of the Spatial Shift Key Receive (SSK-R) antenna 108, and calculating the angular offset based on the known rotational rate of the synchronized receive antenna element 112. In this simple mechanical embodiment a switch 119 is placed on the principal axis 110 of the Spatial Shift Key Receive (SSK-R) antenna 108, below where the rotating receive arm 113 traverses. The switch 119 is triggered when the rotating receive arm 113 passes overhead, and a modulo 1 second time stamp is recorded by the user receiver 107. From this modulo 1 second time stamp the orientation of the Spatial Shift Key Receive (SSK-R) antenna 108 with respect to North 116 can be calculated by dividing the determined travel time (in this case the modulo 1 second time stamp) by the known rotational rate of the synchronized receive antenna element 112. For illustrative example, the synchronized receive antenna element 112 traverses the principal axis 110 of the Spatial Shift Key Receive (SSK-R) antenna 108, the switch 119 is triggered, and a modulo 1 second timestamp of 0.8257 seconds is recorded by the user receiver 107. At one Hertz, one degree of arc is traversed by the receive antenna element 112 in approximately 2.78 milliseconds. Therefore the orientation of the user is 0.8257 seconds divided by 0.00278 seconds, which equates to 297 degrees clockwise relative to North 116.

In an alternative embodiment, orientation of the Spatial Shift Key Receive (SSK-R) antenna 108 with respect to North 116 can be calculated by measuring the angular offset of the spatially synchronized receive antenna rotating arm 113, at the beginning of each signature period. An angular measurement means may be configured with the receiver rotating arm assembly, capable of measuring angular offsets with respect to the principal axis 110 of the Spatial Shift Key Receive (SSK-R) antenna 108. The angular offset of the spatially synchronized receive antenna rotating arm 113 is read from the angular measurement means at the beginning of each signature period, which in this 1 Hertz illustrative example is at the beginning of each second. This measurement corresponds to the time when the spatially synchronized receive antenna rotating arm 113 is traversing its most northerly point of rotation 116, and as such provides an accurate angular offset of the Spatial Shift Key Receive (SSK-R) antenna 108 with respect to North 116.

Electronic Movement of Antenna Phase Centers

Although the physical motion of antenna elements is a simply explained embodiment of the present invention, such a system is considered impractical due to engineering complexity, manufacturing expense and the potential for mechanical problems. Therefore the preferred embodiment of the present invention reveals a method in which Doppler signatures are created electronically. Electronic motion of an antenna phase center can be achieved by spatially distributing antenna elements in a predetermined configuration and successively switching antenna elements to create a synthesized phase center movement.

Figure 4:
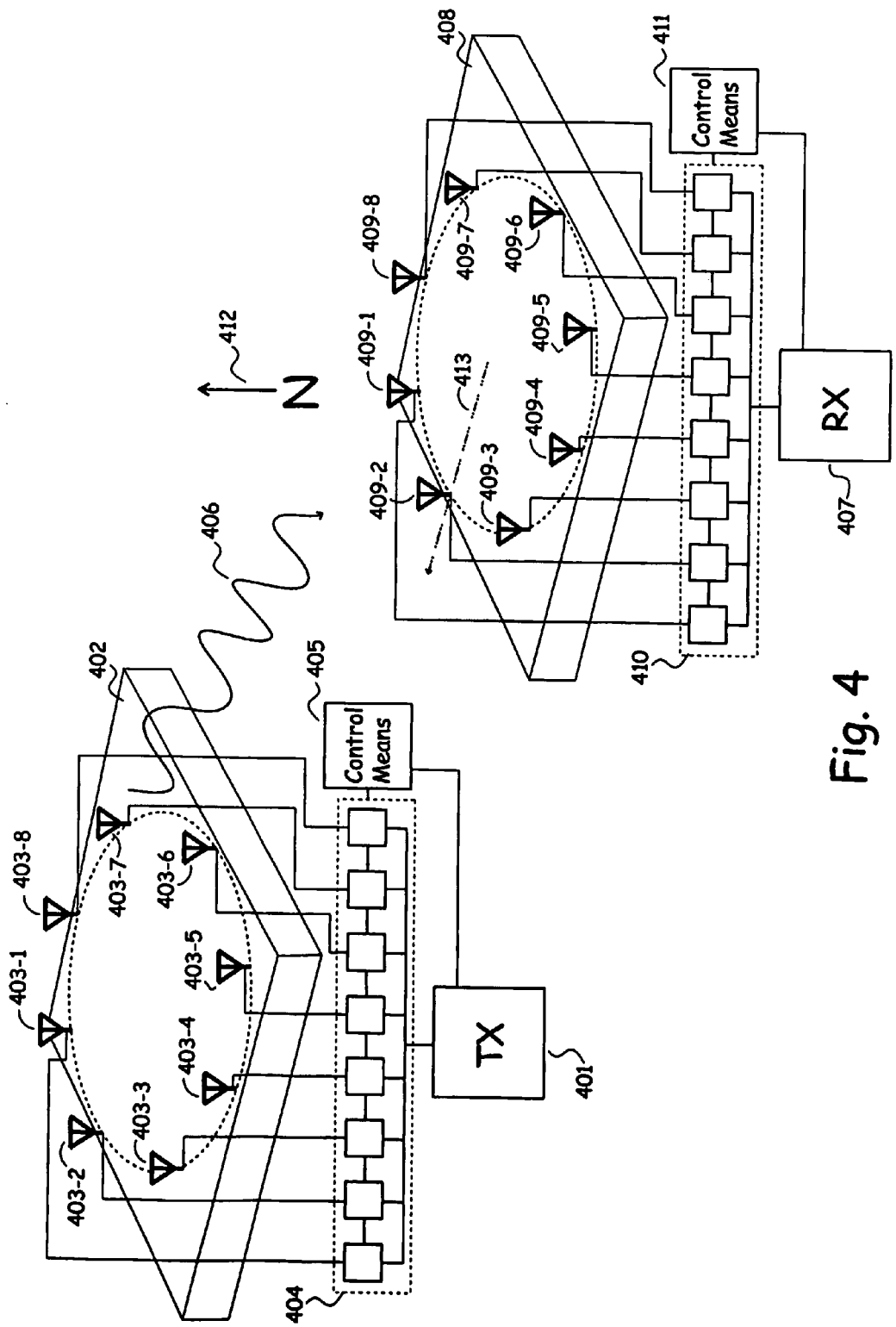
FIG. 4 is a graphical representation of a simple electronically switched embodiment of a Spatial Shift Key (SSK) modulation system according to the present invention, incorporating a Spatial Shift Key Transmit (SSK-T) antenna transmitting a spatially modulated signal to a Spatial Shift Key Receive (SSK-R) antenna.

Referring now to FIG. 4, there is depicted a simple electronically switched embodiment of the present invention. A positioning signal transmitter 401 is configured with a Spatial Shift Key Transmit (SSK-T) antenna 402. The Spatial Shift Key Transmit (SSK-T) antenna 402 comprises an array of eight transmit antenna elements 403-1 to 403-8 mounted in a circular pattern. Each transmit antenna element is connected to a bank of Radio Frequency (RF) switches 404, which in turn is connected to the positioning signal transmitter 401. The RF switch bank 404 is also connected to a control means 405, such as a microprocessor, which can individually activate and deactivate each RF switch in the RF switch bank 404 as required. The control means 405 is configured to activate and deactivate the relevant switch in the RF switch bank 404, so each antenna element 403-1 to 403-8 is switched in succession, such that the transmitted phase center traverses around the array 403-1 to 403-8. This phase center motion induces a predetermined cyclic Doppler upon the transmitted positioning signal 406. Whilst eight antenna elements are used in this illustrative example, any number of antenna elements are deemed to fall within the broad scope and ambit of the present invention.

A user receiver 407 is configured with a Spatial Shift Key Receive (SSK-R) antenna 408 comprising an array of receive antenna elements 409-1 to 409-8 mounted in a circular pattern of identical radius to that of the array of transmit antenna elements 403-1 to 403-8. Each receive antenna element 409-1 to 409-8 is connected to a bank of Radio Frequency (RF) switches 410, which in turn is connected to the user receiver 407. The RF switch bank 410 is also connected to an antenna synchronization control means 411, such as a microprocessor, which can individually activate and deactivate each RF switch within the RF switch bank 410 as required. The antenna synchronization control means 411 is configured to activate and deactivate the relevant switch in the RF switch bank 410, so each receive antenna element 409-1 to 409-8 is switched in succession such that the phase center, and consequently the received signal, traverses around the array 409-1 to 409-8. This motion induces a cyclic Doppler upon the received positioning signal. The antenna synchronization control means 411 is configured to adjust the time of the receiver antenna RF switching bank 410, until the measured received Doppler is at a minimum. The antenna synchronization control means 411 increases or decreases the speed of the receive antenna element switching bank 410, such that the receive antenna phase center slews into alignment with the transmit antenna phase center rotation. Once the measured Doppler is at a minimum the receive antenna switching speed is stabilized to the transmit antenna switching speed and the transmit antenna array 403-1 to 403-8 and the receive antenna array 409-1 to 409-8 are declared spatially correlated. The antenna synchronization control means 411 continuously applies adjustments to the speed of the receive antenna RF switching bank 410 so that the state of spatial correlation is maintained. Whilst eight antenna elements are used in this illustrative example, any number of antenna elements are deemed to fall within the broad scope and ambit of the present invention.

The Spatial Shift Key Transmit (SSK-T) antenna 402 is configured to activate its most northerly antenna element 403-1 at the beginning of each second. Therefore, when the Spatial Shift Key Receive (SSK-R) antenna 408 is spatially synchronized with the Spatial Shift Key Transmit (SSK-T) antenna 402, the location of the currently active receive antenna element at the beginning of each second represents the most northerly point of the Spatial Shift Key Receive (SSK-R) antenna 408 phase center rotation. Furthermore, from this information the orientation of the Spatial Shift Key Receive (SSK-R) antenna 408 relative to North 412 can be determined by measuring the time (modulo 1 second) when the receive antenna element 409-2 positioned on the principal axis 413 of the Spatial Shift Key Receive (SSK-R) antenna 408 is activated. From this modulo 1 second time stamp the orientation of the Spatial Shift Key Receive (SSK-R) antenna 408 with respect to North 412 can be calculated by dividing the determined phase center travel time (in this case the modulo 1 second time stamp) by the known rotational rate of the synchronized phase center of the receive antenna elements 409-1 to 409-8.

Chronological Synchronization

Chronological synchronization of user receiver time with transmitter time can be achieved by utilizing either (1) single-point position solutions, or (2) time modulated onto at least one transmitted positioning signal.

A user receiver may compute a single-point position solution, also known as a Position Velocity Time (PVT) solution, from a chronologically synchronous network of transmitters at known locations. A chronologically synchronous network of transmitters may incorporate Spatial Shift Key (SSK) modulated signals, and therefore allow single point position solutions to be derived from a plurality of Spatial Shift Key (SSK) transmitted positioning signals. Alternatively, single point position solutions may be derived from an external source, such as from a Global Navigation Satellite System (GNSS). Single point position solutions will allow a user receiver to determine network time to accuracies in the order of nanoseconds. Chronologically synchronous networks and single-point position solutions are well known in the art, and are not a subject of the present invention.

A user receiver may alternatively determine transmitter time by receiving time modulated on at least one transmitted positioning signal. This modulated time will be delayed by the time it takes the radio wave to travel from the transmitter to the receiver, known as the signal propagation delay. Time modulated on a transmitted positioning signal that is within several kilometers of the user receiver will therefore yield time accuracy in the order of microseconds.

Multipath Effects on Doppler Signatures

A stationary Spatial Shift Key Receive (SSK-R) antenna may experience cyclical Doppler and signal strength fluctuations as its phase center cuts through the same multipath fade each time it traverses the same location in its spatial pattern. This may cause a repetitive destabilization of the user receiver carrier tracking loop, which appears as a cyclic Doppler to the user receiver. The antenna synchronization control means could mistake this Doppler as a spatial incoherency in the Spatial Shift Key Receive (SSK-R) antenna phase center, and erroneously attempt to correct the antenna synchronization. Therefore, cyclic Doppler due to multipath must be identified and eliminated from the antenna synchronization control means, so consistent spatial synchronization of the Doppler signatures is maintained. The preferred embodiment of the present invention achieves this by using signal strength measurements to identify multipath fades, and then eliminating the Doppler measurements associated with measured signal strength fades. In the preferred embodiment, the antenna synchronization control means only uses Doppler measurements associated with acceptable signal strength levels, where the carrier tracking loops same measuring Doppler correctly. These acceptable signal strength levels are preferably determined by averaging the received signal strength over the signature period, known as the Signature Reference Signal Strength (SRSS), and determining a signal strength threshold below the Signature Reference Signal Strength (SRSS) in which the Doppler measurements are deemed unacceptable. Doppler measurements associated with signal strengths below the threshold are not accepted by the antenna synchronization control means. Alternatively, Signature Reference Signal Strength (SRSS) may be determined using other mathematical techniques such as using the median, standard deviation, variance, skew, kertosis, or similar statistical measure of the received signal strength.

Tracking loop stability can be affected for some time after signal strength resumption. Therefore, a second threshold may also be set for resumption of Doppler utilization by the antenna synchronization control means. For illustrative example, the antenna synchronization control means may ignore Doppler measurements when the signal strength drops 3 dB below the Signature Reference Signal Strength (SRSS), and may resume use of the Doppler measurements when the signal strength increases to 1 dB above the Signature Reference Signal Strength (SRSS).

Figure 5:
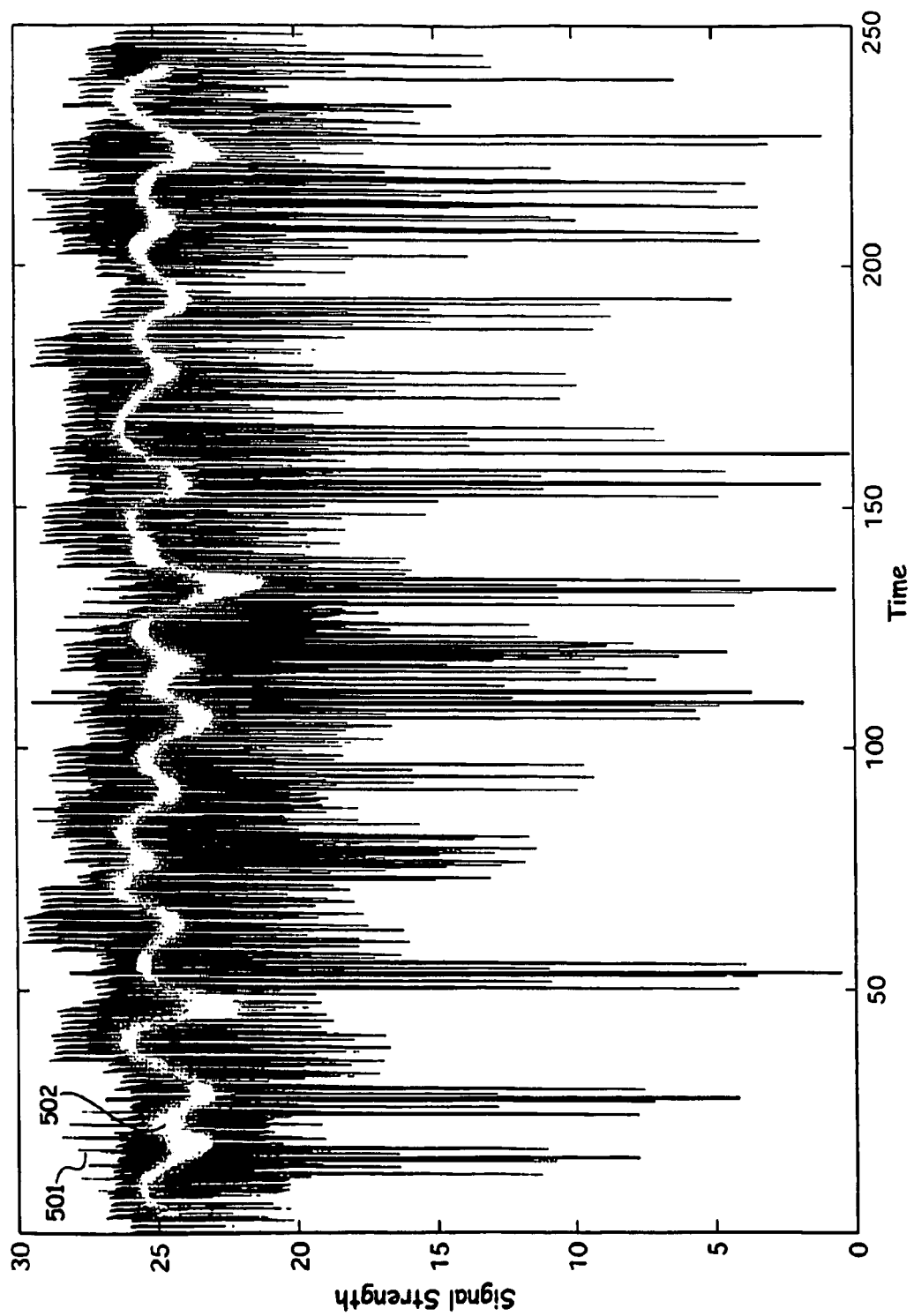
FIG. 5 is a Signal Strength versus Time graph, and a Signature Reference Signal Strength (SRSS) versus Time graph of the simple mechanical embodiment depicted in FIG. 2 and FIG. 3, wherein significant multipath fades are apparent on the Signal Strength measurements.

Referring now to FIG. 5, there is shown a Signal Strength versus Time graph 501, with a Signature Reference Signal Strength (SRSS) versus Time graph 502 superimposed upon it, wherein a stationary Spatial Shift Key Receive (SSK-R) antenna is continuously moving its phase center in a cyclic pattern and traversing a multipath fade. Cyclic power fades are evident in the Signal Strength measurements 501 each time the phase center traverses the multipath fade, which occurs with each complete revolution of the phase center. The Signature Reference Signal Strength (SRSS) measurements 502 are more consistent than the signal strength measurements, thus providing a relatively stable signal strength reference.

Doppler Signature Tracking

The antenna synchronization control means, associated with the Spatial Shift Key Receive (SSK-R) antenna, must maintain the received Doppler at a minimum to maintain spatial correlation with the transmitted Spatial Shift Key (SSK) Doppler signature. In the preferred embodiment of the present invention this is achieved using a specialized tracking loop, known as a Spatial Lock Loop (SLL). The Spatial Lock Loop (SLL) preferably comprises early and late tracking arms, or alternatively early, prompt, and late tracking arms. Tracking arms are created by spatially distributing Doppler signatures within the predetermined cyclic pattern or a Spatial Shift Key Receive (SSK-R) antenna, and calculating Doppler power values for each spatially separated Doppler signature tracking arm. In a planar Spatial Shift Key (SSK) antenna, tracking arms produce Doppler signatures that are described spatially as angularly offset from one another, wherein the early tracking arm creates a Doppler signature in angular advance of the late tracking arm Doppler signature. In the preferred embodiment the received Doppler values from each tracking arm are combined over the signature period to form an early tracking arm Doppler power value and a late tracking arm Doppler power value. These early and late tracking arm Doppler power values are subsequently compared to form correction values, which are passed to the synchronization control means, such that the requisite adjustment to the Spatial Shift Key Receive (SSK-R) antenna phase center motion is made.

In order to determine the correction values required to bring a Spatial Shift Key Receive (SSK-R) antenna into spatial correlation with a transmitted Spatial Shift Key (SSK) Doppler signature, the Doppler autocorrelation response function of the Spatial Shift Key Receive (SSK-R) antenna must be known. To determine this function a Spatial Shift Key Transmit (SSK-T) antenna phase center, of known starting position, is moved through a complete cycle of its signature pattern with fixed angular velocity. Concurrently the Spatial Shift Key Receive (SSK-R) antenna phase center, of known relative starting position, is also moved through a complete cycle of its signature pattern with the same fixed angular velocity. The Doppler autocorrelation response function is generated from this described configuration by (a) determining the angular offset of the Spatial Shift Key Receive (SSK-R) antenna phase center relative to the Spatial Shift Key Transmit (SSK-T) antenna phase center (b) measuring received Doppler over the signature period, (c) combining the measured received Doppler to determine a Doppler power value for the signature period, (d) displaying the determined Doppler power value on the Doppler power verses angular offset graph, (e) incrementing the Spatial Shift Key Receive (SSK-R) antenna phase center starting position (angular offset) by a small amount (for example, 1 degree), and (f) repeating the above steps.

Figure 6:
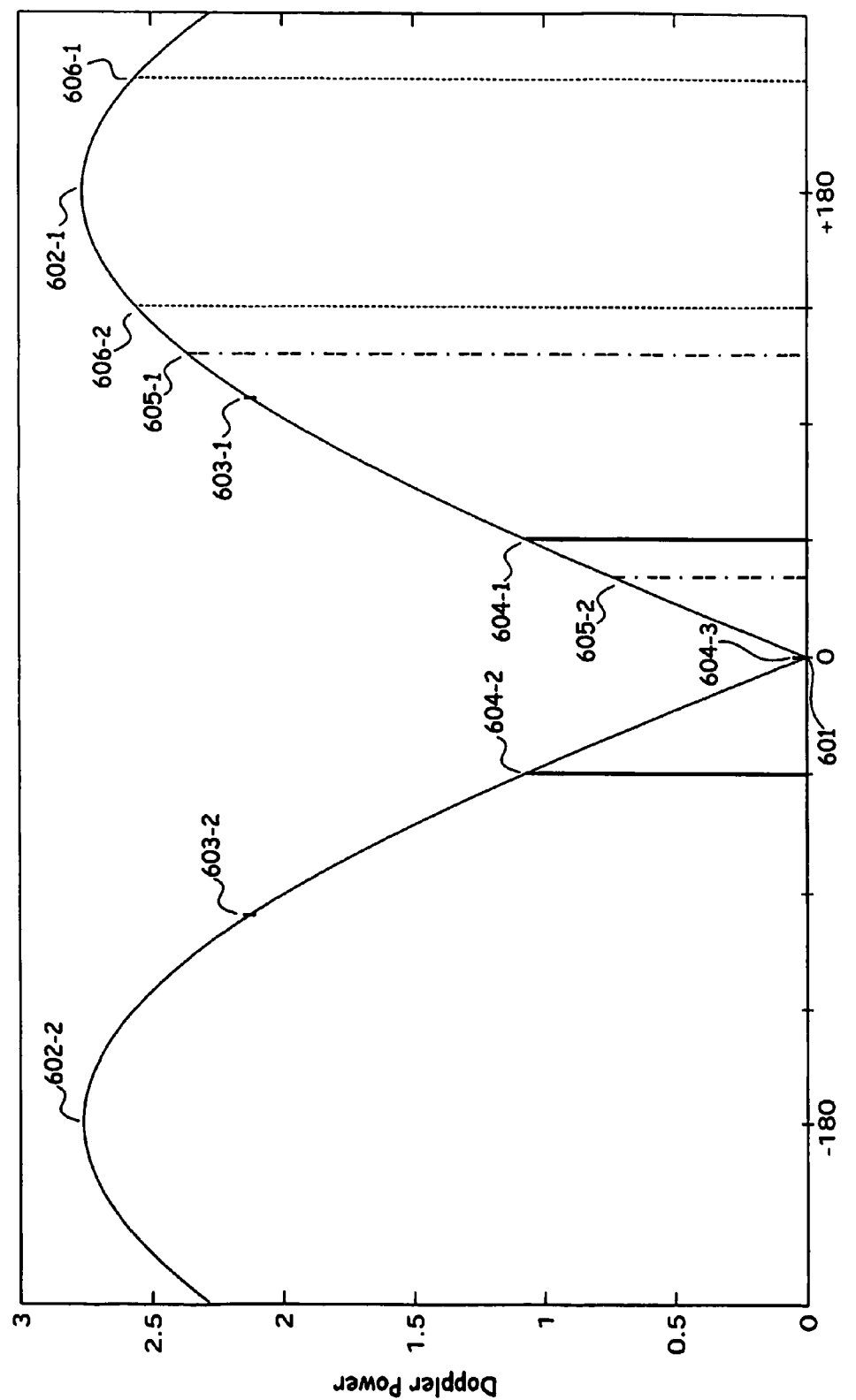
FIG. 6 is a Doppler Autocorrelation Response Function (Doppler Power versus Angular Offset) graph for a Spatial Shift Key Receive (SSK-R) antenna which is tracking a Spatial Shift Key Transmit (SSK-T) antenna.

Referring now to FIG. 6, there is depicted an illustrative example of a Doppler Autocorrelation Response Function (Doppler Power versus Angular Offset) graph for a Spatial Shift Key Receive (SSK-R) antenna which is receiving a Spatial Shift Key Transmit (SSK-T) antenna signal, as described in FIG. 1 through FIG. 4 of this specification. The Spatial Shift Key Receive (SSK-R) antenna phase center is rotating in a circular motion with known attitude and fixed angular velocity, and is receiving a Spatial Shift Key Transmit (SSK-T) antenna modulated signal, which is also rotating its phase center in a circular motion with fixed attitude and the same fixed angular velocity. Both Spatial Shift Key (SSK) antennas are positioned on the same plane with a 360 degree rotation constituting the signature period. At zero-degrees angular offset 601 the Spatial Shift Key Receive (SSK-R) antenna is producing a minimum Doppler power value over the signature period, and is therefore spatially correlated with the transmitted Doppler signature. This is termed the Doppler Power Minima (DPM) 601. At +/−180 degrees 602-1 & 602-2 the Spatial Shift Key Receive (SSK-R) antenna is producing a maximum Doppler power value over the signature period, and therefore is spatially uncorrelated with a transmitted Doppler signature. Angular offsets of the Spatial Shift Key Receive (SSK-R) antenna from the Doppler Power Minima (DPM) at zero-degrees 601 spanning out to approximately plus 100-degrees 603-1 and minus 100-degrees 603-2 produce substantially linear increases in Doppler power, with corresponding decreases in spatial correlation. Doppler Autocorrelation Response Functions which correspond to other Doppler signatures are deemed to fall within the broad scope and ambit of the present invention.

Also depicted in FIG. 6 is a correctly tracking Spatial Lock Loop (SLL), whereby an early racking arm 604-1 is positioned forty-five-degrees ahead of the Doppler Power Minima (DPM) 601, and a late tracking arm 604-2 is positioned forty-five-degrees behind the Doppler Power Minima (DPM) 601. In this configuration the early tracking arm 604-1 and the late tracking arm 604-2 exhibit substantially equal Doppler power values over the signature period. The early tracking arm 604-1 Doppler power value is subtracted from the late tracking arm 604-2 Doppler power value, termed an "early-minus-late" process, to determine a correction magnitude and sign value. These correction magnitude and sign values are subsequently passed to the antenna synchronization control means and the requisite adjustment to the Spatial Shift Key Receive (SSK-R) antenna phase center motion is made. That is, the rotation of the Spatial Shift Key Receive (SSK-R) antenna phase center is advanced or retarded the requisite amount to bring the Spatial Shift Key Transmit (SSK-T) antenna phase center and the Spatial Shift Key Receive (SSK-R) antenna phase center into spatial alignment. This process is continuously updated in a closed-loop manner to maintain the early-minus-late value as closely aligned to zero as possible. When the early-minus-late value is driven below a predetermined threshold the Spatial Shift Key Receive (SSK-R) antenna is declared spatially correlated with the Spatial Shift Key Transmit (SSK-T) antenna.

When the Spatial Lock Loop (SLL) is in acquisition mode, or when there has been a sudden user movement, the early and late tracking arms may not "saddle" the Doppler Power Minima (DPM) 601. Also depicted in FIG. 6 is an illustrative example of a Spatial Lock Loop (SLL) in acquisition mode, whereby the early tracking arm 605-1 is located 120 degrees ahead of the Doppler Power Minima (DPM) 601, and the late tracking arm 605-2 is located 30 degrees ahead of the Doppler Power Minima (DPM) 601. In this configuration the early tracking arm 605-1 and the late tracking arm 605-2 do not straddle the Doppler Power Minima (DPM) 601, and exhibit unequal Doppler power values. The early tracking arm 605-1 Doppler power value is subtracted from the late tracking arm 605-2 Doppler power value (early-minus-late) to determine a correction magnitude and sign. The sign will be correct, and the synchronization control means will move the Spatial Shift Key Receive (SSK-R) antenna rotation in the appropriate direction. However the magnitude will not generally be sufficient to place the early and late tracking arms 605-1 & 605-2 across the Doppler Power Minima (DPM) 601. The correction process may therefore need to be iterated several times before the tracking arms are positioned correctly.

It is also possible for an early tracking arm 606-1 and a late tracking arm 606-2 to align to a 180 degree Doppler peak, like 602-1, and exhibit substantially equal Doppler power values. However, in this situation the early-minus-late tracking value will exhibit the incorrect sign to maintain tracking and the tracking arms 606-1 & 606-2 will "slip off" the Doppler power peak 602-1. Several iterations of this correction process may occur before the tracking arms will be positioned correctly.

In a further embodiment of the present invention a prompt tracking arm may additionally be placed between the early and late tracking arms to expedite the Spatial Lock Loop (SSL) acquisition and tracking process. Also depicted in FIG. 6 is a correctly tracking Spatial Lock Loop (SLL), whereby an early tracking arm 604-1 is positioned forty five degrees ahead of the Doppler Power Minima (DPM) 601, a prompt tracking arm 604-3 is positioned at the Doppler Power Minima (DPM) 601, and a late tracking arm 604-2 is positioned forty five degrees behind the Doppler Power Minima (DPM) 601. The early tracking arm 604-1 value is subtracted from the prompt tracking arm value 6043 (early-minus-prompt) and the late tracking arm 604-2 value is subtracted from the prompt tracking arm value 6043 (late-minus-prompt) to create additional tracking information. The correctly tracking Spatial Lock Loop (SSL) will provide an early-minus-late tracking arm value of approximately zero, with the early-minus-prompt and the late-minus-prompt values providing substantially equal magnitudes and positive signs. If the Spatial Shift Key Receive (SSK-R) antenna shifts slightly off-peak, but the early and late tracking arms continue to "straddle" the Doppler Power Minima (DPM) 601, then the Spatial Lock Loop (SSL) will provide an early-minus-late tracking arm value of non zero, with the early-minus-prompt and the late-minus-prompt values providing unequal magnitudes and positive signs. An incorrectly tracking Spatial Lock Loop (SSL), which does not "straddle" the Doppler Power Minima (DPM) 601, will provide an early-minus-late tracking arm value which is non zero, with the early-minus-prompt and the late-minus-prompt values providing unequal magnitudes and opposite signs. In the case of the Spatial Shift Key Receive (SSK-R) antenna phase center tracking at 180 degrees 602-1 or 602-2 the Spatial Lock Loop (SSL) will provide an early-minus-late tracking arm value which is substantially zero, with the early-minus-prompt and the late-minus-prompt values providing substantially equal magnitudes and negative signs. Therefore, it can be seen that for the Spatial Lock Loop (SSL) to be operating in the correct configuration the early-minus-prompt values and the late-minus-prompt values must provide positive signs. The Spatial Shift Key Receive (SSK-R) antenna synchronization control means slews the receive antenna phase center until positive signs are measured in the early-minus-prompt and the late-minus-prompt tracking arm values. Once positive signs are indicated the early-minus-late tracking arm value is utilized to bring the Spatial Shift Key Receive (SSK-R) antenna phase center into spatial correlation with the Spatial Shift Key Transmit (SSK-T) antenna phase center.

Tracking Arm Techniques

The creation of tracking arms in a Spatial Shift Key Receive (SSK-R) antenna can be achieved in two ways:

(1) A Spatial Shift Key Receive (SSK-R) antenna may be configured to simultaneously produce a plurality of identical Doppler signatures that are spatially offset from one another. Each Doppler signature is individually output into its own discrete radio frequency (RF) front end of a user receiver. All tracking arm Doppler values are therefore generated concurrently. Or, (2) A Spatial Shift Key Receive (SSK-R) antenna may be configured to consecutively generate a plurality of identical Doppler signatures that are spatially offset from one another. Each Doppler signature is consecutively output into a single radio frequency (RF) front end of a user receiver. All tracking arm Doppler values are therefore generated sequentially.

Figure 7:
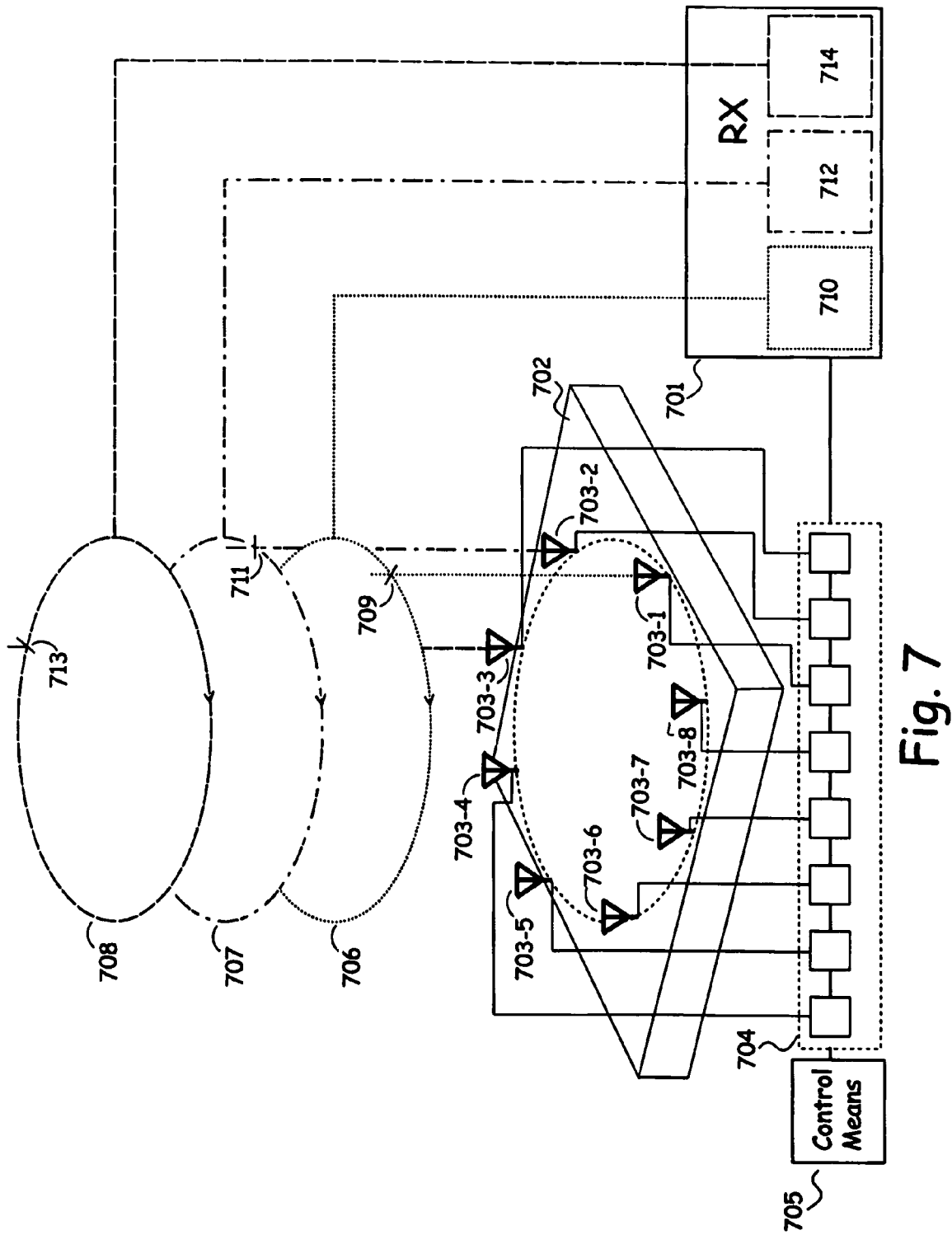
FIG. 7 is a graphical representation of a successive so-called Spatial Lock Loop (SLL) according to the present invention, whereby a Spatial Shift Key Receive (SSK-R) antenna incorporates early, prompt, and late tracking arms which are angularly offset from one another.

In the preferred embodiment of the present invention consecutively generated Doppler signatures are used for the creation of tracking arms in a Spatial Shift Key Receive (SSK-R) antenna. Referring now to FIG. 7, there is depicted a user receiver 701 configured with a Spatial Shift Key Receive (SSK-R) antenna 702 comprising an array of eight receive antenna elements 703-1 to 703-8 mounted in a circular pattern. Each receive antenna element 703-1 to 703-8 is connected to a radio frequency (RF) switch bank 704, which in turn is connected to the user receiver 701. The radio frequency (RF) switch bank 704 is also connected to an antenna synchronization control means 705, such as a microprocessor, which can individually activate and deactivate each radio frequency (RF) switch within the radio frequency (RF) switch bank 704 as required. The antenna synchronization control means 705 is configured to activate and deactivate the relevant switch in the radio frequency (RF) switch bank 704, so that each receive antenna element 703-1 to 703-8 is switched in succession and the phase center, and consequently the received signal, traverses around the array 703-1 to 703-8.

Also shown are three circles 706, 707, and 708 depicting a phase center rotation sequence. Each circle relates to a period which corresponds to a first phase center rotation (early Doppler signature) 706, a second phase center rotation (prompt Doppler signature) 707, and a third phase center rotation (late Doppler signature) 708 of the Spatial Shift Key Receive (SSK-R) antenna 701. A first phase center rotation 706 of the Spatial Shift Key Receive (SSK-R) antenna 702 is initiated at a first receive antenna element 703-1, as a starting point 709 for a complete rotation of the first phase center rotation 706. The measured Doppler power value for the first phase center rotation 706 is stored as an early tracking arm value in early tracking arm memory 710 within the user receiver 701. Immediately after the completion of the first phase center rotation 706 a second phase center rotation 707 of the Spatial Shift Key Receive (SSK-R) antenna 702 is initiated starting at a predetermined angular offset from the starting point 709 of the first phase center rotation 706. In this illustrative example this angular offset is represented by antenna element 703-2. A second phase center rotation of the Spatial Shift Key Receive (SSK-R) antenna 702 is initiated at the second receive antenna element 703-2, as a starting point 711 for a complete rotation of a second phase center rotation 707. The measured Doppler power value for this second phase center rotation 707 is stored as a prompt tracking arm value in prompt tracking arm memory 712 within the user receiver 701. Immediately after the completion of the second phase center rotation 707 a third phase center rotation 708 of the Spatial Shift Key Receive (SSK-R) antenna 702 is initiated starting at a predetermined angular offset from the starting point 711 of the second phase center rotation 707. In this illustrative example this angular offset is represented by antenna element 703-3. A third phase center rotation 708 of the Spatial Shift Key Receive (SSK-R) antenna 702 is initiated at the third receive antenna element 703-3, as a starting point 713 for a complete rotation of a third phase center rotation 708. The measured Doppler power value for this third phase center rotation 708 is stored as a late tracking arm value in late tracking arm memory 714 within the user receiver 701. The Doppler power values stored in the early tracking arm memory 710, the prompt tracking arm memory 712, and the late tracking arm memory 714 are subsequently compared by the user receiver 701 and the Spatial Lock Loop (SSL) magnitude and sign correction values are calculated. These calculated values are subsequently passed to the Spatial Shift Key Receive (SSK-R) antenna synchronization control means 705, so that the necessary adjustment can be made to the Spatial Shift Key Receive (SSK-R) antenna 702 phase center rotation.

In this illustrative embodiment of the present invention there is a 45 degree angular offset between each antenna element 702-1 to 702-8, placing the early tracking arm 90 degrees ahead of the late tracking arm. However, any number of antenna elements, and tracking arm angular offset values, fall within the broad scope and ambit of the present invention.

Doppler Induced by User Movement

User movement of the Spatial Shift Key Receive (SSK-R) antenna induces an additional Doppler component upon the received Doppler signature. Doppler induced by user movement must be eliminated from the antenna synchronization control means, so as not to corrupt the spatial synchronization of Spatial Shift Key (SSK) antennas. This can be achieved using one, or a combination, of the following methods:

Method 1. The Spatial Lock Loop (SLL) methodology of the present invention provides for the subtraction of an early tracking arm Doppler power value with a late tracking arm Doppler power value, known as an early-minus-late process. The process of differencing simultaneous early and late tracking arm Doppler power values received from a single transmitted Doppler signature eliminates all Doppler induced by user movement. Whilst an embodiment of the present invention may capture tracking arm values simultaneously, in the preferred embodiment of the Spatial Lock Loop (SSL) the tracking arm values are captured consecutively. This can lead to a potential error in the early-minus-late value due to the possibility of different user movement during each of two consecutive measurements. This error source is mitigated by increasing the Doppler signature rate, thus decreasing the period between early and late tracking arm measurement epochs, and thus minimizing potential user movement between measurements.

Method 2. Configure and transmit a unique static positioning signal in close proximity to the Spatial Shift Key Transmit (SSK-T) antenna, such that both the static and Spatial Shift Key (SSK) positioning signals are chronologically synchronous and have substantially the same range and unit vector with respect to a roving user receiver. Positioning signals received with substantially the same range and unit vectors exhibit substantially the same Doppler measurements due to user movement at a roving user receiver. In the preferred embodiment the user receiver is configured with a Spatial Shift Key Receive (SSK-R) antenna and a single fixed reference antenna positioned in close proximity to the Spatial Shift Key Receive (SSK-R) antenna. The single fixed reference antenna does not create a received Doppler signature. Spatial Shift Key Transmit (SSK-T) antenna Doppler signatures are received through the Spatial Shift Key Receive (SSK-R) antenna, and the static (non-signature) transmitted positioning signals are received through the fixed reference receive antenna. The antenna synchronization control means is supplied a difference signal which represents the difference between the received fixed reference signal and the Spatial Shift Key (SSK) signal, thereby eliminating user movement.

Method 3. Configure an Inertial Navigation System (INS) with the user receiver and difference the INS signal and the Spatial Shift Key Receive (SSK-R) antenna signal to eliminate user movement. Supply the differenced signal to the antenna synchronization control means. Inertial Navigation Systems are well known in the art and are not a subject of the present invention.

Method 4. Filter low frequency user movement from the relatively high frequency Doppler signature, and supply the high-pass filtered signal to the antenna synchronization control means.

Method 5. Apply so-called Differential Doppler Signatures, as described in detail below.

Differential Doppler Signatures

The present invention further discloses a system and method to determine receiver attitude, unencumbered by user movement and receiver clock drift, by differencing a plurality of transmitted Doppler signatures with a plurality of locally generated receiver Doppler signatures. A transmitter is configured to generate a plurality of unique positioning signals which are transmitted through a plurality of antenna phase centers of a Spatial Shift Key Transmit (SSK-T) antenna, with each antenna phase center exhibiting unique predefined motion. Each unique predefined motion repeats at a unique predetermined interval, thereby inducing a unique predetermined Doppler signature on each transmitted positioning signal. A receiver is configured to receive the plurality of unique Doppler-modified positioning signals through a plurality of antenna phase centers of a Spatial Shift Key Receive (SSK-R) antenna, with each receive antenna phase center receiving a unique positioning signal. Each receive antenna phase center is configured to move with the same unique predefined motion, and repeat at the same unique predetermined interval, as its respective transmit antenna phase center. An antenna synchronization control means within the user receiver continuously adjusts the plurality of antenna phase centers of the Spatial Shift Key Receive (SSK-R) antenna to match the plurality of unique Spatial Shift Key Transmit (SSK-R) Doppler signatures by driving the differenced Doppler power measurement of the received positioning signals towards zero. Once the received Doppler power difference is minimized the Spatial Shift Key Transmit (SSK-T) antenna phase centers and the Spatial Shift Key Receive (SSK-R) antenna phase centers are moving in unison and are declared spatially correlated. The attitude of the Spatial Shift Key Receive (SSK-R) antenna can now be determined precisely relative to the attitude of the Spatial Shift Key Transmit (SSK-T) antenna by measuring the antenna synchronization control means offset required to bring the antennas into spatial correlation. Extraneous Doppler measurements due to user movement or receiver clock drift are eliminated in the differencing process.

Figure 8:
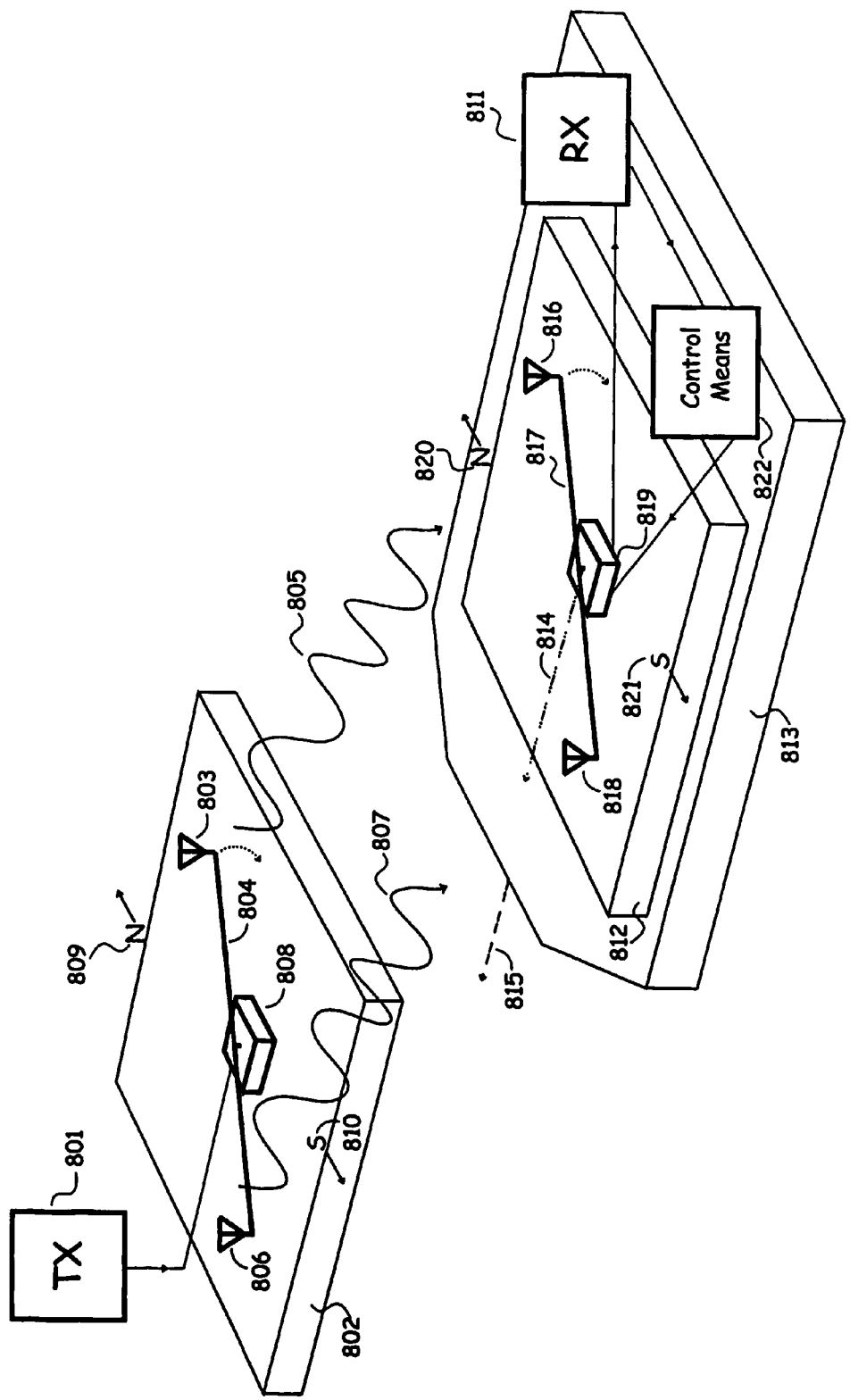
FIG. 8 is a graphical representation of a simple differential mechanical embodiment of a Spatial Shift Key (SSK) modulation system according to the present invention, incorporating a Spatial Shift Key Transmit (SSK-T) antenna transmitting a pair of spatially modulated signals to a Spatial Shift Key Receive (SSK-R) antenna incorporating a pair of receive antenna elements.

Referring now to FIG. 8, there is depicted a simple planar mechanical embodiment of the differential Doppler signature method of the present invention. A positioning signal transmitter 801 is configured with a Spatial Shift Key Transmit (SSK-T) antenna 802. The Spatial Shift Key Transmit (SSK-T) antenna 802 comprises a first transmit antenna element 803 mounted at one end of a rotating arm 804 and transmitting a first unique positioning signal 805, a second transmit antenna element 806 mounted at the opposite end of the rotating arm 804 and transmitting a second unique positioning signal 807, with the center of the rotating arm 804 connected to a rotating means 808, such as a servo motor. The rotating arm 804 has a fixed length, and revolves at a predetermined rate. In this illustrative embodiment, and for ease of explanation, the transmit antennas 803 & 806 rotate in a clockwise direction at a 1 Hz rate (one complete revolution per second), although this rate may be varied to any rate which falls within the receiver tracking loop bandwidth. The transmit rotating arm 804 is also configured so that the first transmit antenna element 803 traverses its most northerly point 809, and the second transmit antenna element 806 traverses its most southerly point 810, at the beginning of each second.

A user receiver 811 is configured with a Spatial Shift Key Receive (SSK-R) antenna 812, which is mounted on a user platform 813 and situated on the same plane as the Spatial Shift Key Transmit (SSK-T) antenna 802. The Spatial Shift Key Receive (SSK-R) antenna 812 is attached to the user platform 813 with fixed orientation, such that the principal axis 814 of the Spatial Shift Key Receive (SSK-R) antenna 812 is preferably aligned with the principal axis 815 of the body frame of the user platform 813. The Spatial Shift Key Receive (SSK-R) antenna 812 comprises a first receive antenna element 816 mounted at one end of a rotating arm 817, and receiving the first unique positioning signal 805 transmitted from the first transmit antenna element 803, a second receive antenna element 818 mounted on the opposite end of the rotating arm 817 and receiving the second unique positioning signal 807 transmitted from the second transmit antenna element 806, with the center of the rotating arm 817 connected to a rotating means 819, such as a servo motor. The rotating arm 817 has identical length to the transmit rotating arm 804, and is capable of revolving at a variable rate. The user receiver 811 is configured to receive the first transmitted positioning signal 805 from the first transmit antenna element 803 through the first receive antenna element 816, and measure the Doppler value of the first received positioning signal 805. Concurrently the user receiver 811 is configured to receive the second transmitted positioning signal 807 from the second transmit antenna element 806 through the second receive antenna element 818, and measure the Doppler value of the second received positioning signal 807. A varying cyclic Doppler will be observed by the user receiver 811 dependent upon the relative motion of the transmit antenna elements 803 & 806 with respect to the receive antenna elements 816 & 818. When the first transmit antenna element 803 and the first receive antenna element 816 are rotating in unison both antenna elements will traverse the most northerly point (point 809 and point 820) of their respective rotations concurrently. Simultaneously, the second transmit antenna element 806 and the second receive antenna element 818 will traverse the most southerly point (point 810 and point 821) of their respective rotations. The antennas are said to be spatially synchronized, with the measured Doppler between the first transmit antenna element 803 and first receive antenna element 816 being at a minimum, and the measured Doppler between the second transmit antenna element 806 and the second receive antenna element 818 being at a minimum also. The first received Doppler observation is then subtracted from the second received Doppler observation, which in this case yields a substantially zero Doppler difference. This substantially zero Doppler difference is unperturbed by user movement, as all user induced Doppler is removed in the process of differencing the first positioning signal 805 with the second positioning signal 807.

If antenna element rotations diverge from this state of spatial correlation, the Doppler difference will increase until the antenna elements are rotating 180 degrees out of phase relative to each other, and the measured Doppler difference is at a maximum. When the first transmit antenna element 803 and the first receive antenna element 816 are rotating 180 degrees out of phase with one another the first transmit antenna element 803 traverses the most northerly point of its rotation 809 while the first receive antenna element 816 traverses the most southerly point of its rotation 821. Simultaneously, the second transmit antenna element 806 traverses the most southerly point of its rotation 810, while the second receive antenna element 818 traverses the most northerly point of its rotation 820. The antennas are said to be spatially unsynchronized, with the measured Doppler between the rust transmit antenna element 803 and first receive antenna element 816 being at a maximum, and the measured Doppler between the second transmit antenna element 806 and the second receive antenna element 818 being at a maximum also. Importantly, these Doppler observations are 180 degrees out of phase with one another when measured by the user receiver 811. The rust received Doppler observation is then subtracted from the second received Doppler observation, which yields a doubling of the maximum measured Doppler amplitude, due to the out-of-phase nature of the two observables. Importantly, this doubled Doppler difference is unperturbed by user movement, as all user induced Doppler is removed in the differencing process. Furthermore, the doubled Doppler difference supplies the antenna synchronization control means 822 with a higher resolution control signal, thus providing improved spatial correlation of Doppler signatures. The antenna synchronization control means 822 is configured to adjust the speed of the receive rotating means 819, until the measured received Doppler difference is at a minimum. The antenna synchronization control means 822 increases or decreases the speed of the receive rotating means 819, which in turn increases or decreases the speed of the rotating receive antenna elements 816 & 818, so that the receive antenna elements 816 & 818 slew into alignment with the transmit antenna elements 803 & 806 rotation. Once the measured Doppler difference is at a minimum the receive antenna element rotation speed is stabilized to the transmit antenna element rotation speed (in this example 1 Hz) and the transmit antenna elements and the receive antenna elements are declared spatially correlated. The antenna synchronization control means 822 continuously applies corrections to the rotational speed of the receive antenna rotating means 819 to maintain spatial synchronization with the transmit antenna elements, such that when the Spatial Shift Key Receive (SSK-R) antenna platform 813 is reoriented due to user movement spatial correlation is maintained. Attitude of the user platform is then determined as previously described in this specification.

Differential Doppler Signatures may be received through a user receiver incorporating a plurality of radio frequency (RF) front-ends or by a user receiver incorporating a single radio frequency (RF) front-end which is multiplexed in a time division multiple access (TDMA) scheme. A plurality of radio frequency (RF) front-ends may each be assigned to track a unique Doppler signature from a Spatial Shift Key Receive (SSK-R) antenna, such that full correlation power is received from each transmitted signature. Concurrent reception of Doppler signatures through more than one RF front-end allows for greater received correlation power for each Doppler signature, due to the greater received duty cycle, but creates the potential for varying group delay and line bias between disparate radio frequency RF front-ends. Alternatively, the reception of each signature can be time shared through a single radio frequency (RF) front-end, such that each Doppler signature from a Spatial Shift Key Receive (SSK-R) antenna is allocated a unique reception time slot. In this embodiment the Spatial Shift Key Receive (SSK-R) antenna incorporates a switching means which consecutively switches between Doppler signatures. This switching is preferably done within the integration period of the user receiver carrier tracking loop, so that measurement updates between signatures are updated simultaneously. Multiplexed reception of Doppler signatures in a Time Division Multiple Access (TDMA) scheme decreases received correlation power for each Doppler signature, due to the decreased duty cycle, but eliminates the potential for varying group delay and line bias.

Differential Doppler Signatures may also be applied to Doppler Signatures which are created electronically and to the Spatial Lock Loop (SSL) method described previously in this specification.

Multipath Mitigation Using Differential Doppler Signatures

Differential Doppler Signatures consist of a plurality of positioning signals that are transmitted from, and received at, different locations concurrently. Therefore, a user receiver configured to receive the transmitted positioning signals will experience different multipath effects on each positioning signal at any given instant in time. The received signal strength power of the plurality of signatures are substantially the same in a multipath free environment, as the distances from the transmit antennas to the receive antennas are substantially the same. A robust Signature Reference Signal Strength (SRSS) measurement for each positioning signal can be determined by averaging received signal strength power levels for each positioning signal over the signature period. Positioning signal received signal strength power levels that drop below the Signature Reference Signal Strength (SRSS) by a predetermined amount are considered to be adversely affected by multipath and their Doppler power measurements are either eliminated from the antenna synchronization control means measurement, or alternatively the Doppler power measurements are corrected before being applied to the antenna synchronization control means.

When a Spatial Shift Key Receive (SSK-R) antenna, configured to receive a plurality of Doppler signatures, is spatially synchronized with a Spatial Shift Key Transmit (SSK-T) antenna transmitting a plurality of Doppler signatures, the individual tracking values for each transmit/receive pair are substantially the same. When a first receive antenna enters a multipath fade the associated receiver tracking loop Doppler value will be corrupted according to the severity of the fade. However, a second receive antenna which concurrently is not in a multipath fade will have an associated receiver tracking loop Doppler value which is accurate. This accurate tracking loop Doppler value can be used by the first receiver tracking loop while its own value is corrupt. Once the multipath fade has been traversed by the first receive antenna, and received signal strength has been restored, tracking loop control is resumed by the first receive channel tracking loop. Therefore, the present invention allows for accurate tracking loop values to be substituted for multipath distorted tracking loop values, such that greater tracking performance is achieved in multipath environments. In practice, this method provides a system whereby tracking values are traded between tracking loops as each receive antenna enters and exits multipath fades.

Furthermore, the Doppler values obtained from individual tracking loops which are deemed to be tracking correctly may be accumulated by the user receiver to create a so-called composite Integrated Carrier Phase (ICP) measurement. This composite Integrated Carrier Phase (ICP) measurement inherently accumulates only "good" Doppler values, free from the deleterious effects of severe multipath, and therefore provides a more robust ranging method in multipath environments when compared to systems not using the present invention.

Attitude Determined from a Single Spatial Shift Key Transmit (SSK-T) Antenna

A user receiver configured to receive a Differential Doppler Signature can determine attitude using at least one transmitted Differential Doppler signature. The process of differencing the first Doppler signature with the second Doppler signature eliminates both user movement Doppler and also user receiver clock drift. Therefore, the differenced signal can be used to determine antenna spatial synchronization without accurate time being available. The time stamp modulated on the Differential Doppler positioning signals is sufficient to determine time to the microsecond level, which at a rotational rate of one Hertz, will yield an orientation error in the order of several thousandths of a degree. This method can also be applied to a pair of Spatial Shift Key (SSK) and static positioning signals and also to early-minus late tracking configurations, as previously described in this specification. The process of differencing simultaneous early and late tracking arm Doppler power values eliminates all Doppler induced by user movement and user receiver clock drift.

Attitude Determined from a Plurality of Spatial Shift Key Transmit (SSK-T) Antennae In the previously disclosed embodiments of the present invention a Spatial Shift Key Receive (SSK-R) antenna may determine attitude from a single Spatial Shift Key Transmit (SSK-T) antenna. However, in some circumstances attitude determination may be degraded due to errors incurred by multipath and poor received signal strengths. Therefore the present invention further discloses a system and method to determine receiver attitude by spatially correlating a received Doppler signature with a plurality of spatially-distributed yet identical transmitted Doppler signatures. A plurality of spatially distributed transmitters is configured to each generate at least one unique positioning signal which is transmitted through a Spatial Shift Key Transmit (SSK-T) antenna. Each Spatial Shift Key Transmit (SSK-T) antenna is configured with identical attitude and identical predefined motion, such that all transmit antenna phase centers move in unison. The unique predefined motion repeats at a predetermined interval, thereby inducing an identical predetermined Doppler signature on each transmitted positioning signal. A receiver is configured to receive the transmitted Doppler-modified positioning signals through a Spatial Shift Key Receive (SSK-R) antenna, which is moving its phase center with the same predefined motion, and which repeats at the same predetermined interval as all transmit antenna phase centers. The Spatial Shift Key Receive (SSK-R) antenna therefore induces a second Doppler component on the already Doppler-modified positioning signals. An antenna synchronization control means within the receiver continuously adjusts the Spatial Shift Key Receive (SSK-R) antenna predefined motion to match the Spatial Shift Key Transmit (SSK-T) Doppler signatures by driving the measured Doppler of the received positioning signals toward zero. Once the received Doppler is minimized the Spatial Shift Key Transmit (SSK-T) antennas and the Spatial Shift Key Receive (SSK-R) antenna are moving in unison and are spatially synchronized. The attitude of the Spatial Shift Key Receive (SSK-R) antenna can now be determined precisely relative to the attitude of the Spatial Shift Key Transmit (SSK-T) antennas by measuring the antenna synchronization control means offset required to bring the antennas into spatial correlation.

Attitude error due to multipath is significantly reduced using this method due to the antenna synchronization control means having a plurality of identical transmitted Doppler signatures to select from. As one received Doppler signature suffers adversely from multipath other identical Doppler signatures, which are not adversely affected by multipath, will be available to the antenna synchronization control means. Received signal strength can be compared to Signature Reference Signal Strength (SRSS) to determine when a signature is in a fade. Therefore, the present invention provides an attitude determination means robust to the adverse affects of multipath when compared to systems not using the present invention.

Rapid Attitude Update Rates

In the previously disclosed embodiments of the present invention the Spatial Shift Key (SSK) Doppler signature repeat period is constrained by the carrier tracking loop bandwidths employed in user receivers. Therefore, in a further embodiment of the present invention a system and method to determine receiver attitude with fast update rates is disclosed. This system and method work without the need to perform Doppler signature tracking using receiver carrier tracking loops.

A transmitter, configured to generate a positioning signal which is transmitted through a Spatial Shift Key Transmit (SSK-T) antenna, moves its phase center with rapid predefined motion, preferably with this signature motion contained in a volume within a radius of ¼ of the transmit signal's wavelength. This predefined motion repeats at a predetermined interval, thereby inducing a predetermined high-rate Doppler signature on the transmitted positioning signal. The transmitted Doppler signature is modulated at a frequency which is slower than a user receiver phase measurement period, but faster than the user receiver carrier tracking loop update rate.

A user receiver, configured to receive the Doppler-modified positioning signal through a Spatial Shift Key Receive (SSK-R) antenna, moves with the same rapid predefined motion, repeating at the same predetermined interval as the Spatial Shift Key Transmit (SSK-T) antenna. This Spatial Shift Key Receive (SSK-R) antenna therefore induces a second high-rate Doppler component on the already Doppler-modified transmitted positioning signal. The user receiver is configured to measure received positioning signal carrier phase measurements, preferably in-phase and quadrature (I & Q) measurements, once every correlator integration period, and update the carrier tracking loop no more than once every signature period. The measured phase values over the signature period are compared and a Doppler power value for the signature period is computed. The computed Doppler power for the signature period is then used as the measurement to track the attitude of the Spatial Shift Key Receive (SSK-R) antenna as previously described in this specification. In-phase and quadrature (I & Q) measurement techniques, as well as user receiver correlator integration techniques, are well known in the art and not a subject of the present invention.

For illustrative example, referring again to FIG. 4, there is depicted a Spatial Shift Key Transmit (SSK-T) antenna 402 comprising an array of transmit antenna elements 403-1 to 403-8 mounted in a circular configuration. Each antenna element is activated in succession for a period of one millisecond each, such that the phase center traverses around the array every 8 milliseconds. This phase center movement therefore induces a Doppler signature upon the transmitted positioning signal with a frequency of 125 Hz. A user receiver 407 is configured with a Spatial Shift Key Receive (SSK-R) antenna 408 comprising an array of receive antenna elements 409-1 to 409-8 mounted in a circular pattern of identical radius to that of the array of transmit antenna elements 403-1 to 403-8. Each antenna element 409-1 to 409-8 is activated in succession for a period of one millisecond each, such that the phase center traverses around the array every 8 milliseconds. This phase center movement therefore induces a further Doppler signature upon the received positioning signal with a Doppler signature frequency of 125 Hz. The integration period of the user receiver carrier tracking loop is set to one millisecond, so that in-phase and quadrature (I & Q) phase values are generated each millisecond. The tracking loop is configured to update after the completion of each Doppler signature period (every 8 milliseconds), so that the carrier tracking loop digital controlled oscillator (DCO) value remains substantially constant during the signature period. Eight in-phase and quadrature (I & Q) phase values are measured against the constant carrier tracking loop digital controlled oscillator (DCO) value, which correspond to the phase received from each receive antenna element 409-1 to 409-8 in the Spatial Shift Key Receive (SSK-R) antenna 408. These eight in-phase and quadrature (I & Q) phase values are subsequently compared to one another to derive eight Doppler measurements. These eight Doppler measurements are aggregated to compute a combined Doppler power value for the signature period. This can be mathematically represented by any of the following computations on the eight Doppler measurements: (a) summing the squares, (b) root-mean-square (RMS), (c) the mean of the absolute values, (d) the sum of the absolute values, or any similar mathematical operation. The determined combined Doppler power over the signature period is then used to track the attitude of the Spatial Shift Key Receive (SSK-R) antenna 408 as previously described in this specification. This process is continuously updated every signature period.

Signature period Doppler power may be computed in a number of ways from the measured in-phase and quadrature (I & Q) phase values. The simplest and least processor intensive approach to determine Doppler power is to difference the phase measurements from pairs of adjacent receive antenna elements and divide by the switching period to determine individual Doppler measurements. These Doppler measurements are then combined to determine a composite Doppler power over the signature period. In-phase and quadrature (I & Q) phase values of adjacent receive antenna elements are differenced to determine a phase change between antenna elements. These phase differences represent a range change over a known period of time (the antenna switching period), which therefore provides a measure of Doppler. The individual measured Doppler values collected over the signature period are preferably converted to a composite value, such as an RMS Doppler power value or the like, which is used in the determination of Spatial Shift Key Receive (SSK-R) antenna attitude.

Instantaneous in-phase and quadrature (I & Q) phase values are inherently noisy measurements. Therefore in a further embodiment of the present invention in-phase and quadrature (I & Q) phase values from each receive antenna element are coherently integrated over a plurality of signature periods before being used to determine a high-accuracy Doppler measurement Referring again to FIG. 4, the first receive antenna element 409-1 is activated for 1 millisecond at the beginning of each 8 millisecond signature period. The first in-phase and quadrature (I & Q) sample of the first signature period is accumulated with the first in-phase and quadrature (I & Q) sample from the second signature period, which is accumulated with the first in-phase and quadrature (I & Q) sample of the third signature period, and so on. These accumulations are performed for each receive antenna element 409-1 to 409-8, so that at the end of a predetermined number of signature periods, improved low noise in-phase and quadrature (I & Q) phase values are available for precise Doppler determination. If the carrier tracking loop digital controlled oscillator (DCO) in the user receiver 407 is updated after each signature period, a correction value may need to be applied to each in-phase and quadrature (I & Q) value before being accumulated with the in-phase and quadrature (I & Q) value from the previous signature period. This correction value will account for the phase change caused by the digital controlled oscillator (DCO) changing frequency between signature periods. Also, any data bits that occur during the coherent integration period need to be accounted for.

In a further alternate embodiment of the present invention, phase differences measured between adjacent antenna elements are coherently integrated over a plurality of signature periods, such that a change in frequency of the digital controlled oscillator (DCO), or a change in data bits, does not adversely affect the accumulated measurements. Referring again to FIG. 4, the first receive antenna element 409-1 is activated for 1 millisecond and a first in-phase and quadrature (I & Q) phase value is stored in memory. Subsequently, the second receive antenna element 409-2 is activated for 1 millisecond and a second in-phase and quadrature (I & Q) phase value is stored in memory. The first stored in-phase and quadrature (I & Q) phase value and the second stored in-phase and quadrature (I & Q) phase value are differenced to determine a phase change between the first and second antenna elements 409-1 & 409-2. This differenced measurement is stored in memory and accumulated with differenced measurements from the same two antenna elements 409-1 & 409-2 of subsequent signature periods. This procedure is also applied to all other adjacent elements in the array. For example, the second antenna element 409-2 is differenced with the third antenna element 409-3, the third antenna element 409-3 is differenced with the forth antenna element 409-4, and so on. Accumulating differenced measurements eliminates the need to apply corrections to the accumulated in-phase and quadrature (I & Q) phase values due to digital controlled oscillator (DCO) frequency change or data bit phase change. However, a boundary condition at each frequency update point of the digital controlled oscillator (DCO) and at each data bit transition are preferably taken into account.

The rapid Doppler signature method described above also provides the user with the ability to dynamically assign attitude update rates dependant upon user circumstance. For example, if the user requires fast attitude updates and can tolerate lower measurement precision, the user receiver 407 can be configured to provide single signature attitude updates. If the user requires higher precision attitude and can tolerate slower attitude update rates, the user receiver 407 can be configured to provide attitude updates over a plurality of signature periods.

The present invention therefore discloses a method whereby Spatial Shift Key (SSK) signatures are not tracked, nor constrained, by conventional carrier tracking loop techniques, but rather are derived from instantaneous phase values measured by a user receiver over each Doppler signature period.

Altitude Determination Using Pattern Recognition of Doppler Signatures

In a further embodiment of the present invention the antenna synchronization control means, as previously described, is replaced with a pattern recognition algorithm to determine attitude. Doppler Signatures are generated and transmitted through Spatial Shift Key Transmit (SSK-T) antennas, and receivers are configured with Spatial Shift Key Receive (SSK-R) antennas as previously described. The Spatial Shift Key Receive (SSK-R) antenna generates its predetermined Doppler Signature with a fixed orientation. That is, the Spatial Shift Key Receive (SSK-R) antenna phase center traverses its principal axis at the top of each epoch, and doesn't attempt to spatially correlate with the transmitted Doppler Signature. Different orientations of the Spatial Shift Key Receive (SSK-R) antenna produce different Doppler patterns over the signature period. These Doppler patterns are compared and matched with predetermined Doppler patterns associated with particular Spatial Shift Key Receive (SSK-R) antenna orientations, These predetermined Doppler patterns are preferably stored in the user receiver memory, so that orientation is determined directly from the discerned Doppler pattern. User movement Doppler may be removed using one of the techniques described previously in this specification. Therefore, the present invention discloses the use of pattern recognition of Spatial Shift Key (SSK) modulated signals to determine attitude.

Three-Dimensional Doppler Signatures

The present invention also discloses a system and method to produce three-dimensional attitude determination using three-dimensional Doppler signatures. Three-dimensional Doppler signatures are produced using Spatial Shift Key Transmit (SSK-T) antennas that move their radiating means in three-dimensional space. Three-dimensional movement can be achieved in a Spatial Shift Key Transmit (SSK-T) antenna by distributing antenna elements in a three-dimensional shape, such as a sphere or tetrahedron, and successively switching between elements to generate a three-dimensional Doppler signature. The preferred embodiment uses four antenna elements to generate a three-dimensional Doppler signature, however the generation of a three-dimensional Doppler signature using any number of antenna elements fall within the broad scope and ambit of the present invention.

Phase Center Panning

Electronic motion of an antenna phase center can be achieved by spatially distributing antenna elements in a predetermined configuration and successively switching elements to create a synthesized phase center movement, as previously described in this specification. However, the resolution of this method is constrained by the number of antenna elements available, with the use of additional antenna elements creating greater complexity and cost. Furthermore, the potential performance degradation caused by increased mutual coupling as antenna element separation is decreased, is also significant.

The present invention discloses a method and device to produce high resolution synthesized phase center movement without the need for an extensive number of antenna elements. A plurality of antenna elements, which are spatially distributed within a quarter wavelength of one another, are each connected to individual variable gain sections, such as radio frequency (RF) digital attenuators. A control means, such as a microprocessor, is configured to control the level of gain from each variable gain section, so that the gain of each antenna element can be individually modified. Varying the gain distribution between antenna elements of an antenna array has the effect of shifting the phase center of the array. Thus, as gain is redistributed between antenna elements the phase center of the array is displaced and a synthesized Doppler is induced upon the signal. The resolution of the phase center shift is thus determined by the resolution of the variable gain sections, and is not constrained by the requirement for physical displacement of antenna elements.

Therefore the present invention discloses a method and device to create high resolution synthesized phase center movement with minimal antenna elements. This technique is termed phase center "panning". Phase center panning is reciprocal; that is, varying the gain distribution between antenna elements in a transmit array or in a receive array will induce the same synthesized Doppler effect upon the signal. By varying the gain distribution between antenna elements in a continuous predetermined manner a continuous predetermined phase center movement will be generated, which will be measured as a cyclic Doppler shift by an observing carrier-phase user receiver. This technique can thus be applied to the system and method of Spatial Shift Key (SSK) modulation of the present invention.

Figure 9:
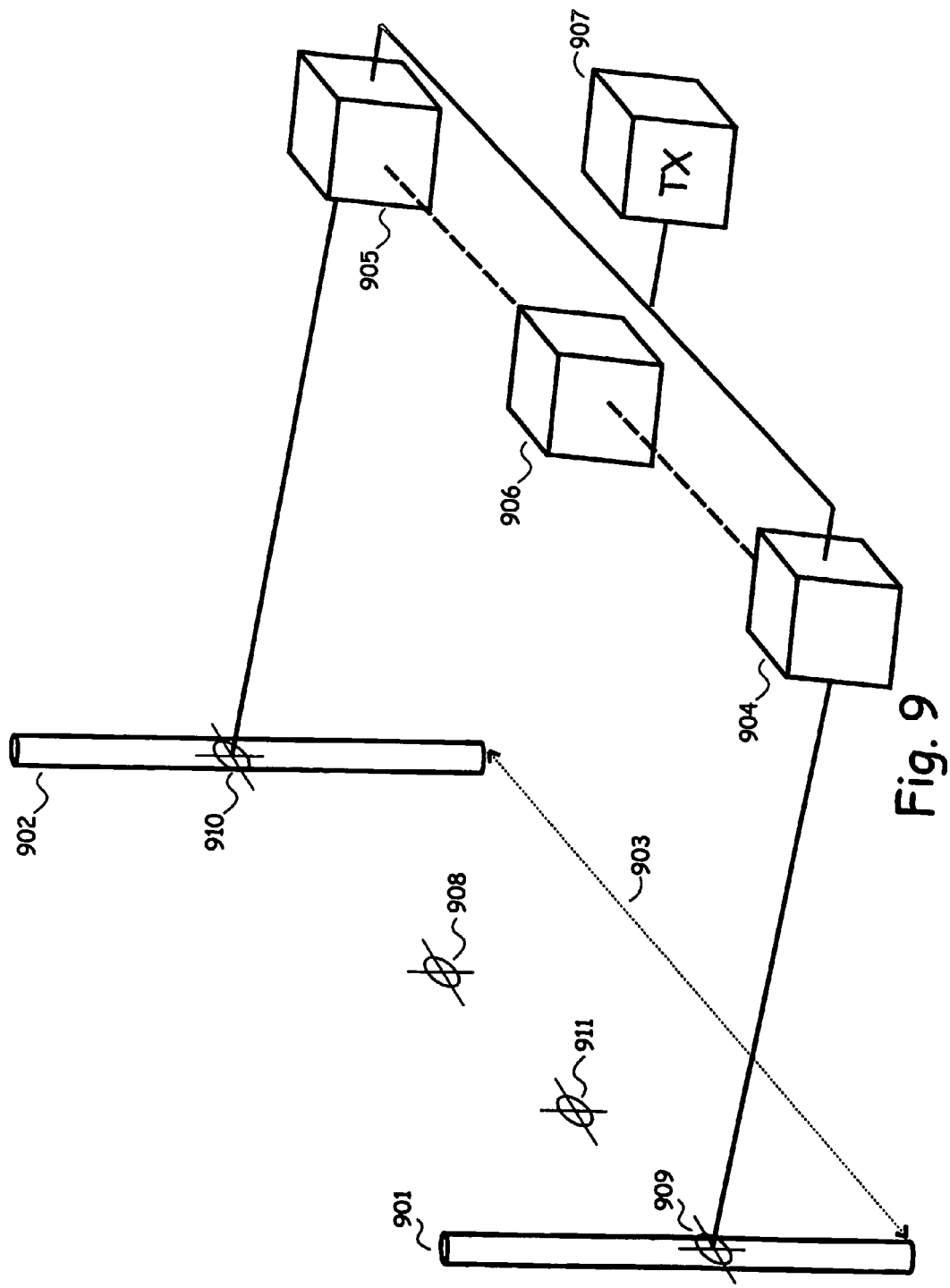
FIG. 9 is a graphical representation of an electronically panned array according to the present invention, incorporating two spatially distributed antenna elements, a transmission source, two variable gain means, and a control means.

Referring now to FIG. 9, there is depicted an electronically phase center panned array incorporating two identical length spatially distributed antenna elements 901 and 902, separated by one quarter wavelength 903 of the broadcast signal frequency. Each driven antenna element 901 & 902 is configured with a variable gain means 904 & 905, such as a digital attenuator or variable gain amplifier. Each variable gain means 904 & 905 is configured with a control means 906, such as a microprocessor, to allow gain adjustment of individual variable gain means 904 & 905 and subsequent gain adjustment of individual antenna elements 901 & 902. Each antenna element 901 & 902 is connected through its respective variable gain means 904 & 905, to a common transmission source 907. Both transmission lines between the transmission source 907 to the first driven antenna element 901, and between the transmission source 907 to the second driven antenna element 902 are of equal length to maintain phase relationships within the two transmission circuits. When the microprocessor 906 issues an identical gain command to the digital attenuators 904 & 905 both antenna elements 901 & 902 will radiate equal energy from the common transmission source 907. Ignoring any mutual coupling between antenna elements, the radiation pattern of driven elements 901 & 902, which constitute the phase center panned array, will be elliptical, with end-fire power being reduced by approximately 3 dB due to the 90 degree signal phase cancellation in those directions. An equal radiation from both the antenna elements 901 & 902 places the phase center of the antenna array half way 908 between the two elements 901 & 902 received signal strength power. When the received signal strength power control means 906 issues a maximum gain command to the first digital attenuator 904 and a minimum gain command to the second digital attenuator 905 the first antenna element 901 will radiate maximum energy and the second antenna element 902 will radiate minimum energy. The phase center 909 of the antenna array is now substantially positioned at the first antenna position 901, radiating in an omni-directional pattern. Conversely, when the control means 906 issues a maximum gain command to the second digital attenuator 905 and a minimum gain command to the first digital attenuator 904 the second antenna element 902 will radiate maximum energy and the first antenna element 901 will radiate minimum energy. The phase center 910 of the antenna array is now substantially positioned at the second antenna position 902, radiating in an omni-directional pattern. Therefore, when gain is inversely applied to antenna elements in an incremental manner the effective phase center of the array will be moved or "panned" between elements. For example, when the control means 906 issues a ¼ attenuation command to the first digital attenuator 904 and a ¾ attenuation command to the second digital attenuator 905 the first antenna element 901 will radiate ¾ of its maximum energy and the second antenna element 902 will radiate ¼ of its maximum energy. The phase center of the antenna array 911 is now positioned between the antenna elements at ¹⁄₁₆ of the broadcast frequency wavelength away from the first antenna position 901, radiating in a substantially omni-directional pattern. In this way, inversely applied incremental gain between ¼ wavelength distributed antenna elements provides a substantially linear phase center movement between antenna elements, providing the basis for an electronically phase center panned array of the present invention.

In the preferred embodiment of an electronically phase center panned array, antenna elements are placed in a three-dimensional shape such as a tetrahedron, so that three-dimensional Spatial Shift Key (SSK) modulation can be generated. Electronically phase center panned arrays remove any constraints imposed by fixed antenna elements only being able to generate fixed Doppler patterns. The preferred embodiment of the present invention therefore allows any three-dimensional geometric shape to be generated as a Spatial Shift Key (SSK) signature.

Figure 10:
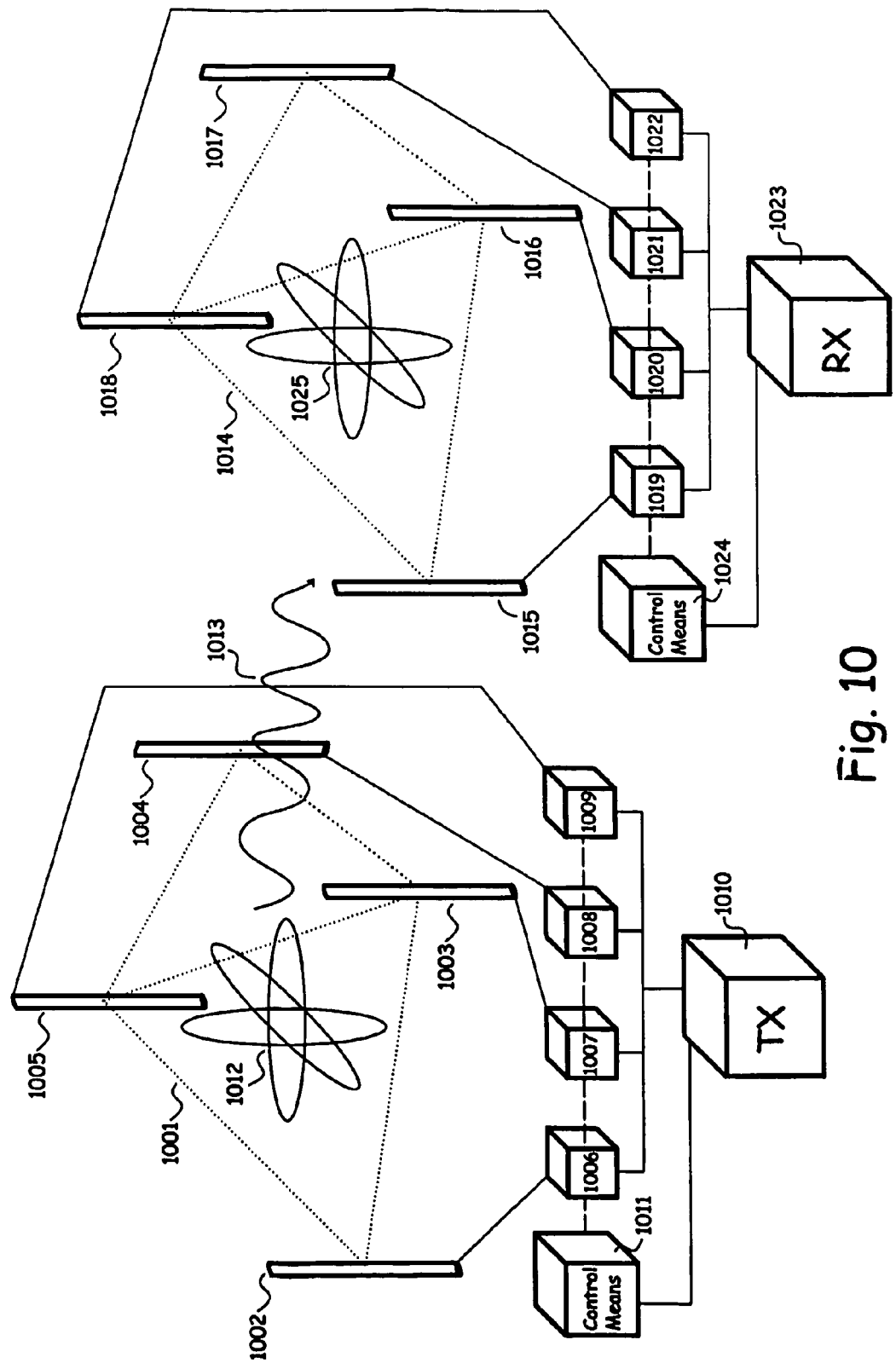
FIG. 10 is a graphical representation of a three-dimensional panned Spatial Shift Key Transmit (SSK-T) antenna and a matching three-dimensional panned Spatial Shift Key Receive (SSK-R) antenna according to the present invention. Each Spatial Shift Key (SSK) antenna incorporates four antenna elements spatially distributed within a quarter wavelength of one another and placed in a tetrahedral shape.

Referring now to FIG. 10, there is depicted a three-dimensional panned Spatial Shift Key Transmit (SSK-T) antenna 1001, incorporating four transmit antenna elements 1002, 1003, 1004, & 1005 spatially distributed within a quarter wavelength of one another and placed in a tetrahedral shape. Each transmit antenna element 1002, 1003, 1004, & 1005 is configured to transmit with an omni-directional gain pattern. For illustrative example, a crossed dipole antenna element pair fed in quadrature would produce a substantially omni-directional gain pattern. Each transmit antenna element 1002, 1003, 1004, & 1005 is connected to a variable gain means, such as a digital attenuator 1006, 1007 1008, & 1009, which is connected to a common transmission source 1010. Each variable gain means 1006, 1007 1008, & 1009 is also connected to a control means, such as a microprocessor 1011, so that the gain of each transmit antenna element 1002, 1003, 1004, & 1005 can be individually adjusted. As energy from the transmission source 1010 is redistributed between antenna elements 1002, 1003, 1004, & 1005 by the control means 1011 adjusting the variable gain means 1006, 1007 1008, & 1009 the phase center of the array is displaced and a synthesized three-dimensional Doppler signature 1012 is induced upon the transmitted signal 1013. This three-dimensional phase center movement is configurable to any pattern within the tetrahedron described by the antenna element 1002, 1003, 1004, & 1005 locations. Therefore an infinite number of Spatial Shift Key (SSK) signatures are possible. For illustrative example, the control means 1011 may be configured to produce a phase center movement which ascribes a circular motion in three mutually perpendicular planes, thus producing a Doppler signature 1012 in the three axes of x, y, & z However, any other pattern of movement of the antenna phase center falls within the broad scope and ambit of the present invention.

There is also depicted a three-dimensional panned Spatial Shift Key Receive (SSK-R) antenna 1014, incorporating four receive antenna elements 1015, 1016, 1017, & 1018 spatially distributed within a quarter wavelength of one another and placed in a tetrahedral shape. Each antenna element 1015, 1016, 1017, & 1018 is configured to transmit with an omnidirectional gain pattern. Each receive antenna element 1015, 1016, 1017, & 1018 is connected to a variable gain means, such as a digital attenuator 1019, 1020, 1021, & 1022, which are connected to a user receiver 1023. Each variable gain means 1019, 1020, 1021, & 1022 is also connected to a control means, such as a microprocessor 1024, so that the gain of each receive antenna element 1015, 1016, 1017, & 1018 can be individually adjusted. As energy from the transmitted signal 1013 is redistributed between receive antenna elements 1015, 1016, 1017, & 1018 by the control means 1024 adjusting the variable gain means 1019, 1020, 1021, & 1022, the phase center of the array is displaced and a synthesized three-dimensional Doppler signature 1025 is induced upon the received signal. The control means 1024 is configured to replicate the three-dimensional phase center motion of the transmitted Doppler signature 1012, and subsequently drive the received Doppler to a minimum. For illustrative example, the control means 1024 is configured to produce a phase center movement which ascribes a circular motion in three mutually perpendicular planes, thus producing a Doppler signature 1025 in the three axes of x, y, & z, in the same manner as the transmitted Doppler signature 1012. Doppler powers are measured for each axis and three-dimensional attitude is determined using methods described previously in this specification.

In a further embodiment of the present invention panned Spatial Shift Key (SSK) transmit and receive arrays may be configured with overall dimensions larger than one quarter wavelength. Antenna element control means are configured so that phase center panning takes place only between antenna elements which are spatially distributed within a quarter wavelength of each other. Antenna elements which are spatially distributed further apart than one quarter wavelength are excluded from the panning process. For illustrative example, antenna elements are positioned in a circular configuration with a quarter wavelength spacing between successive antenna elements. High resolution spatial modulation is achieved by panning between pairs of successive antenna elements.

Unique Positioning Signals

In the preferred embodiment of the present invention each transmitter transmits a unique positioning signal, which consists of a carrier component, a pseudorandom code component, and a navigation data component. The carrier component is a sinusoidal radio frequency wave preferably transmitted in the 2.4 GHz ISM band, although the method of the present invention is equally applicable to other frequency bands. The pseudorandom number (PRN) code component is modulated upon the carrier component, and consists of a unique code sequence which can be distinguished amongst other pseudorandom code sequences transmitted by other devices on the same carrier frequency. This technique is known as Code Division Multiple Access (CDMA), and is well-known in the art. The navigation data component is proprietary information modulated upon the pseudorandom code component, and provides a communications link to transfer time and other transmitter or network specific information to user receivers. Navigation information may include network time and other desired network data.

It will of course be realized that whilst the above has been given by way of an illustrative example of this invention, all such and other modifications and variations hereto, as would be apparent to persons skilled in the art, are deemed to fall within the broad scope and ambit of this invention as is herein set forth.

What is claimed is:

1. A method for determining attitude, the method comprising:
    a) transmitting a signal through a radiating means which moves through three-dimensional space with a predetermined movement, such that a cyclic Doppler is superimposed upon the transmitted signal;
    b) receiving said transmitted signal at a receiving means which moves through three-dimensional space with a predetermined movement, such that a cyclic Doppler is superimposed upon the received signal;
    c) adjusting said predetermined movement of said receiving means to bring said cyclic Doppler superimposed upon said received signal to a predetermined Doppler value such that said receiving means slews into alignment with said radiating means; and
    d) determining the attitude of said receiving means based upon the required adjustment to said predetermined movement of said receiving means.

2. The method of claim 1, wherein said predetermined Doppler value of step (c) is a minimum.

3. The method of claim 1, wherein said predetermined movement of said receiving means in step (b) is a replica of said predetermined movement of said radiating means in step (a).

4. A method for determining attitude, the method comprising:
    a) transmitting a signal through a radiating means which moves through three-dimensional space with a predetermined movement, such that a cyclic Doppler is superimposed upon the transmitted signal;
    b) receiving said transmitted signal at a receiving means which moves through three-dimensional space with a predetermined movement, such that a cyclic Doppler is superimposed upon the received signal;
    c) analysing said cyclic Doppler superimposed upon said received signal to determine a Doppler pattern; and
    d) determining the attitude of said receiving means by matching said determined Doppler pattern to pre-defined Doppler patterns associated with known relative attitudes of said radiating means and said receiving means.

5. A method for determining attitude, the method comprising:
    a) transmitting a plurality of signals from a plurality of spatially distributed transmission means configured with at least one or more radiating means, said radiating means configured to move through three-dimensional space with identical predetermined movement, with each of said plurality of signals assigned to one of said radiating means, such that an identical cyclic Doppler is superimposed upon each transmitted signal;
    b) receiving said plurality of transmitted signal at a receiving means which moves through three-dimensional space with a predetermined movement, such that a cyclic Doppler is superimposed upon the received signal;

c) adjusting said predetermined movement of said receiving means to bring said cyclic Doppler superimposed upon said received signal signals to a predetermined value such that said receiving means slews into alignment with said radiating means; and d) determining the attitude of said receiving means based upon the required adjustment to said predetermined movement of said receiving means.

6. A method for determining the attitude of a mobile apparatus, the method comprising the steps of:

a) transmitting a positioning signal through radiating means, said radiating means moving its phase centre through three-dimensional space with a predetermined movement at a predetermined interval, such that a first cyclic doppler is superimposed upon said positioning signal;

b) receiving said positioning signal through receiving means, said receiving means moving its phase centre through three-dimensional space with a predetermined movement at a predetermined interval, such that a second cyclic doppler is observed by said receiving means;

c) measuring a combined cyclic doppler observed by said receiving means, said combined cyclic doppler comprising said first cyclic doppler and said second cyclic doppler;

d) adjusting said predetermined interval of said receiving means, such that said combined cyclic Doppler is minimised, said receiving means slews into alignment with said radiating means and said receiving means is brought into spatial correlation with said radiating means;

e) determining the attitude of said mobile apparatus based on the required adjustment to said predetermined movement of said receiving means.

7. A method for determining the attitude of a mobile apparatus according to claim 6, wherein said predetermined interval of said receiving means is substantially similar to said predetermined interval of said radiating means.

8. A method for determining the attitude of a mobile apparatus according to claim 6, said method further comprising the steps of:

a) dedicating a principal axis to said radiating means within a reference frame;

b) dedicating a principal axis to said mobile apparatus within its body frame;

c) dedicating a principal axis to said receiving means relative to said mobile apparatus principal axis;

d) measuring a time from when said receiving means phase centre traverses through said reference frame principal axis to when said receiving means phase centre traverses through said receiving means principal axis; and e) calculating the attitude of said mobile apparatus principal axis based on said measured time and said relationship between said receiving means principal axis and said mobile apparatus principal axis.

9. A method for determining the attitude of a mobile apparatus according to claim 6, said method further comprising the steps of:

a) dedicating a principal axis to said radiating means within a reference frame;

b) dedicating a principal axis to said mobile apparatus within its body frame;

c) dedicating a principal axis to said receiving means relative to said mobile apparatus principal axis;

d) measuring the angular offset of said receiving means principal axis with respect to said reference frame principal axis at the beginning of said predetermined interval of said receiving means; and e) calculating the attitude of said mobile apparatus principal axis based on said measured angular offset and said relationship between said receiving means principal axis and said mobile apparatus principal axis.

10. A method for determining the attitude of a mobile apparatus according to claim 6, said method further comprising the steps of:

a) measuring carrier phase measurements of said positioning signal at a receiver carrier phase measurement rate, said receiver carrier phase measurement rate being faster than said predetermined interval of said radiating means;

b) updating a carrier tracking loop within said receiving means at a receiver tracking loop update rate, said receiver carrier tracking loop update rate being slower than or equal to said predetermined interval of said radiating means;

c) comparing said carrier phase measurements to a digital controlled oscillator within said carrier tracking loop;

d) aggregating said carrier phase measurements to determine a combined cyclic doppler value.

11. A method for determining the attitude of a mobile apparatus, the method comprising the steps of:

a) transmitting a plurality of positioning signals through a plurality of radiating means, each of said plurality of radiating means moving its phase centre through three-dimensional space with a predetermined motion at a predetermined interval, such that a first cyclic doppler is superimposed upon each of said plurality of positioning signals;

b) receiving said plurality of positioning signals through a plurality of receiving means, each of said plurality of receiving means moving its phase centre through three-dimensional space with a predetermined motion at a predetermined interval, such that a second cyclic doppler is observed by each of said plurality of receiving means;

c) measuring a plurality of combined cyclic doppler observed by said plurality of receiving means, each of said combined cyclic doppler comprising a first cyclic doppler superimposed upon one of said plurality of positioning signals and a second cyclic doppler observed by one of said plurality of receiving means;

d) differencing said first cyclic doppler from each of said plurality of positioning signals with said second cyclic doppler observed by each of said plurality of receiving means;

e) adjusting the predetermined motion of the respective phase centres of said plurality of receiving means to match said predetermined motion of the respective phase centres of said plurality of radiating means, such that said receiving means slews into alignment with said radiating means thereby to minimise said plurality of combined cyclic Doppler;

f) determining the attitude of said plurality of said mobile apparatus based on the required adjustment to said predetermined motion of said receiving means.

12. A method for determining the attitude of a mobile apparatus according to claim 11, wherein said adjustment to said predetermined motion of said radiating means and said receiving means brings the respective phase centres of said plurality of receiving means into spatial correlation with the respective phase centres of said plurality of radiating means.

13. A method for determining the attitude of a mobile apparatus according to claim 11, wherein said predetermined interval of said receiving means is substantially similar to said predetermined interval of said radiating means.

14. A method for determining the attitude of a mobile apparatus, the method comprising the steps of:
- a) transmitting a positioning signal through radiating means, said radiating means moving its phase centre through three-dimensional space with a predetermined movement at a predetermined interval, such that a first cyclic doppler is superimposed upon said positioning signal;
- b) receiving said positioning signal through receiving means, said receiving means moving its phase centre through three-dimensional space with a predetermined motion at a predetermined interval, such that a second cyclic doppler is observed by said receiving means;
- c) continuously measuring a combined cyclic doppler observed by said receiving means, said combined cyclic doppler comprising said first cyclic doppler and said second cyclic doppler;
- d) continuously matching said combined cyclic doppler with predetermined doppler patterns associated with said receiving means;
- e) determining the attitude of said receiving means based on said matched predetermined doppler patterns.

15. A method for determining the attitude of a mobile apparatus according to claim 14, wherein said predefined doppler patterns are stored in memory means of said receiving means.

16. A method for determining the attitude of a mobile apparatus according to claim 14, said method further comprising the steps of:
- a) measuring carrier phase measurements of said positioning signal at a receiver carrier phase measurement rate, said receiver carrier phase measurement rate being faster than said predetermined interval of said radiating means;
- b) updating a carrier tracking loop within said receiving means at a receiver tracking loop update rate, said receiver carrier tracking loop update rate being slower than or equal to said predetermined interval of said radiating means;
- c) comparing said carrier phase measurements to a digital controlled oscillator within said carrier tracking loop;
- d) aggregating said carrier phase measurements to determine a combined cyclic doppler value.

17. A method for determining the attitude of a mobile apparatus according to claim 14, wherein said carrier phase measurements of said positioning signal are in-phase and quadrature (I & Q) measurements.

18. A method for determining the attitude of a mobile apparatus according to claim 14, wherein said predefined motion of said radiating means is contained in a volume within a radius of one-quarter of said positioning signal's wavelength.

* * * * *